United States Patent
Oki et al.

(10) Patent No.: US 11,215,133 B2
(45) Date of Patent: Jan. 4, 2022

(54) FUEL INJECTION CONTROL APPARATUS

(71) Applicant: Hitachi Automotive Systems, Ltd., Hitachinaka (JP)

(72) Inventors: Kotaro Oki, Hitachinaka (JP); Osamu Mukaihara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/049,097

(22) PCT Filed: Feb. 13, 2019

(86) PCT No.: PCT/JP2019/004951
§ 371 (c)(1),
(2) Date: Oct. 20, 2020

(87) PCT Pub. No.: WO2019/207903
PCT Pub. Date: Oct. 31, 2019

(65) Prior Publication Data
US 2021/0239063 A1    Aug. 5, 2021

(30) Foreign Application Priority Data

Apr. 27, 2018  (JP) .............................. JP2018-086160

(51) Int. Cl.
*F02D 41/20* (2006.01)
*F02D 41/40* (2006.01)
(Continued)

(52) U.S. Cl.
CPC ........... *F02D 41/20* (2013.01); *F02D 41/401* (2013.01); *F02M 51/061* (2013.01); *F02D 2041/389* (2013.01); *F02D 2200/0618* (2013.01)

(58) Field of Classification Search
CPC .. F02D 41/20; F02D 41/401; F02D 2041/389; F02D 2200/0618; F02M 51/061
See application file for complete search history.

(56) References Cited

U.S. PATENT DOCUMENTS 10,914,263 B2 * 2/2021 Hauser .................... F02D 41/20
2006/0137661 A1 * 6/2006 Hayakawa .............. F02D 41/20
123/499
(Continued)

FOREIGN PATENT DOCUMENTS

JP       2002-021679 A    1/2002
JP       2014-152697 A    8/2014
(Continued)

OTHER PUBLICATIONS

International Search Report with English translation and Written Opinion issued in corresponding application No. PCT/JP2019/004951 dated May 28, 2019.

*Primary Examiner* — Carl C Staubach
(74) *Attorney, Agent, or Firm* — Foley & Lardner LLP

(57) ABSTRACT

The present invention provides a fuel injection control apparatus that can suppress variations in fuel injection amounts in a very small fuel injection region. For this purpose, the fuel injection control apparatus includes a fixed injection pulse generator 10 and a drive current interruption unit 31. The fixed injection pulse generator 10 generates a fixed injection pulse having a valve opening timing at which a drive current is supplied to an electromagnetic coil 19 in an electromagnetic fuel injection valve 18 and a first valve closing timing at which the drive current to the electromagnetic coil 19 is interrupted. Within a period in which the fixed injection pulse is generated, the drive current interruption unit 31 determines an electric energy amount of a drive current supplied to the electromagnetic coil in response to a valve opening timing of the fixed injection pulse. When this electric energy amount reaches a preset, predetermined target electrical energy amount, the drive current interruption unit generates a second valve closing timing of the fixed injection pulse different from the first (Continued)

valve closing timing and then interrupts the drive current supplied to the electromagnetic coil before the first valve closing timing.

14 Claims, 10 Drawing Sheets

(51) Int. Cl.
    *F02M 51/06*     (2006.01)
    *F02D 41/38*     (2006.01)

(56)     References Cited

U.S. PATENT DOCUMENTS

2014/0311459 A1*  10/2014  Katsurahara ............ F02D 41/30
                                                                             123/478
2015/0377176 A1   12/2015  Hatanaka
2016/0237937 A1    8/2016  Kusakabe
2017/0226950 A1    8/2017  Tanaka
2018/0017005 A1*   1/2018  Kusakabe ........... F02D 41/3064

FOREIGN PATENT DOCUMENTS

JP         2016-037870 A    3/2016
JP         2017-122462 A    7/2017
WO    WO-2004/053317 A1   6/2004

\* cited by examiner

FUEL INJECTION CONTROL APPARATUS

TECHNICAL FIELD

The present invention relates to a fuel injection control apparatus for electromagnetic fuel injection valves via which fuel is to be supplied to an internal combustion engine. More specifically, the present invention relates to a fuel injection control apparatus for electromagnetic fuel injection valves via which fuel is to be injected into cylinders.

BACKGROUND ART

Recent strict regulations on exhaust gases such as carbon dioxide and concerns about depletion of fossil fuels such as oil have increased demand for improved fuel efficiency (fuel consumption rate) of internal combustion engines. To satisfy such demand, modern fuel injection control apparatuses are requested to employ multistage injection control, in which fuel is intermittently or separately injected into cylinders during an intake stroke, during a compression stroke, or during a period from the intake stroke to the compression stroke.

Under the multistage injection control, individual fuel injection amounts are set to an amount obtained by dividing the target amount of fuel injected required for one combustion cycle by the number of separated injections. Alternatively, the individual fuel injection amounts are set to different amounts.

As described above, each of amounts of fuel injected separately is smaller than a regular fuel injection amount. When such small amounts of fuel are injected via electromagnetic fuel injection valves, full lift control, in which valve bodies of the electromagnetic fuel injection valves are fully lifted, may fail to inject small amounts of fuel precisely. Unlike the full lift control, half lift control, in which the valve bodies of the electromagnetic fuel injection valves are stopped at midway points before fully lifted and then fuel is injected in this state, can inject small amounts of fuel precisely.

Herein, the full lift control refers to control in which a valve closing operation is started after a stroke displacement of a movable core that drives the valve bodies of the electromagnetic fuel injection valves is maximized with respect to that when the valves are fully closed. The half lift control refers to control in which the valve closing operation is started before the stroke displacement of the movable core that drives the valve bodies of the electromagnetic fuel injection valves is maximized with respect to that when the valves are fully closed. Examples of a fuel injection control apparatus with a multistage injection control system which performs the full lift control and the half lift control are disclosed in JP 2014-152697 A (PTL 1) and JP 2016-37870 A (PTL 2).

CITATION LIST

Patent Literature

PTL 1: JP 2014-152697 A
PTL 2: JP 2016-037870 A

SUMMARY OF INVENTION

Technical Problem

As described above, the half lift control can precisely inject fuel during an operation state where the valve bodies provided in the electromagnetic fuel injection valves have not yet reached a position at which the valve bodies are fully opened. Current fuel injection control apparatuses are, however, requested to inject further decreased amounts of fuel. When such very small fuels are injected, variations in the amounts of the fuel injected via the electromagnetic fuel injection valves in the cylinders can turn out to be a problem. The variations in the fuel injection amounts may be attributed to individual differences (machine differences) between the electromagnetic fuel injection valves.

When very small amounts of fuel are injected, variations in the amounts of fuel injected are caused by a mechanical difference between electrical characteristics of electrical components provided in the electromagnetic fuel injection valves. Examples of the electrical characteristics of the electrical components include: coil resistances of electromagnetic coils; inductances of the electromagnetic coils; and inductances of harnesses. As described above, the electric characteristics of the electromagnetic fuel injection valves differ from one another. In which case, when very small amounts of fuel are injected, a phenomenon occurs in which energy amounts of the drive currents supplied to the respective electromagnetic fuel injection valves differ from one another, even when time widths of injection pulses and set values of drive currents supplied to the respective electromagnetic fuel injection valves are equal to one another.

Since different amounts of energy of the drive currents are supplied to the respective electromagnetic fuel injection valves, lift amounts of the valve bodies differ from one another. As a result, different amounts of fuel are injected via the electromagnetic fuel injection valves. Variations in the fuel injection amounts caused by the difference between the electrical characteristics of the electromagnetic fuel injection valves become prominent within a half lift region in which the half lift control is performed, more specifically, within a region in which very small amounts of fuel are injected.

To solve such problems, the amounts of energy supplied to the electromagnetic coils of the electromagnetic fuel injection valves, or integrated current values of the drive currents (=electric energy amount) are each regulated so as to become a predetermined target integrated current value. In this way, the machine differences between the electrical characteristics of the respective electromagnetic fuel injection valves are compensated for, and the variations in the fuel injection amounts are thereby reduced.

The above electric energy amount can be determined by multiplying the current value of the drive currents flowing through the electromagnetic coils by an applied voltage and an elapsed time. In the region where very small amounts of fuel are injected, a constant high voltage is applied to the electromagnetic coils in the electromagnetic fuel injection valves in order to swiftly open the valve elements. In which case, the applied voltage can be regarded as being constant with time.

Therefore, the total current amount related to the elapsed time, or the electric integrated current value, is regarded as the electric energy amount. Then, the electric energy amount is regulated so as to become a predetermined target electric integrated current value for each electromagnetic fuel injection valve. In this way, it is possible to reduce the variations in the fuel injection amounts which are based on the machine difference between the electrical characteristics of the electromagnetic fuel injection valves.

Drive states of the electromagnetic fuel injection valves are controlled with injection pulses. More specifically, the drive current flows through the electromagnetic coil in response to the rising edge of the injection pulse (referred to below as the valve opening timing). In addition, the drive current stops flowing through the electromagnetic coil in response to the falling edge of the injection pulse (referred to below as the valve closing timing). Thus, to regulate the above electric energy amount, it is necessary to perform an integration operation of the current flowing through the electromagnetic coil in synchronization with the valve opening timing of the injection pulse.

Then, when the integrated current value reaches a predetermined target integrated current value, the drive current interrupts the drive current flowing through the electromagnetic coil, independently of the valve closing timing of the injection pulse.

As described above, as the valve closing timings, a valve closing timing based on the injection pulse and a valve closing timing based on the current integration control are generated. Therefore, a drive circuit that controls the drive current flowing through the electromagnetic coil is set to logic that validates the valve closing timing applied earlier to the drive circuit.

As described above, the drive current stops flowing through the electromagnetic coil either at the valve closing timing based on the injection pulse or at the valve closing timing based on the current integration control. If the valve closing timing of the injection pulse is generated due to any reason (e.g., the execution of a pulse width correction function) before the integrated current value reaches the predetermined target integrated current value, the drive current to the electromagnetic coil is forcibly interrupted at the valve closing timing of the injection pulse, although the drive current needs to be interrupted at the valve closing timing based on the current integration control. As a result, variations in fuel injection amounts newly occur, which may lead to deterioration of exhaust performance and fuel consumption efficiency.

As described above, there is a request to further suppress the variations in the fuel injection amounts in the very small fuel injection region of the half lift region.

An object of the present invention is to provide a fuel injection control apparatus that can suppress variations in fuel injection amounts in a very small fuel injection region within a half lift region.

Solution to Problem

A feature of the present invention is that a fixed injection pulse generator and a drive current interruption unit are provided. The fixed injection pulse generator generates a fixed injection pulse, as an injection pulse for use in driving an electromagnetic fuel injection valve. This fixed injection pulse has a valve opening timing at which a drive current is supplied to an electromagnetic coil in the electromagnetic fuel injection valve and a first valve closing timing at which the drive current supplied to the electromagnetic coil are interrupted. Within a period in which the fixed injection pulse is generated, the drive current interruption unit determines an electric energy amount of the drive current supplied to the electromagnetic coil in response to the valve opening timing of the fixed injection pulse. When the determined electric energy amount reaches a preset, predetermined target electric energy amount, the drive current interruption unit generates a second valve closing timing of the fixed injection pulse different from the first valve closing timing and interrupts the drive current supplied to the electromagnetic coil before the first valve closing timing.

Advantageous Effects of Invention

According to the above, the first valve closing timing of the fixed injection pulse is generated only after the electric energy amount given to the electromagnetic coil reaches the preset, predetermined target electric energy amount and the second valve closing timing is generated. Therefore, the electromagnetic fuel injection valve reliably shifts to the valve closing operation at a time when the electric energy amount reliably reaches the target electric energy amount, thereby suppressing variations in fuel injection amounts to improve exhaust performance and fuel efficiency performance.

DESCRIPTION OF EMBODIMENTS

Some embodiments of the present invention will be described below in detail with reference to the accompanying drawings. It should be noted that the present invention is not limited to the following embodiments, and various modifications and applications within a technical concept of the present invention also fall within the scope.

Figure 1:
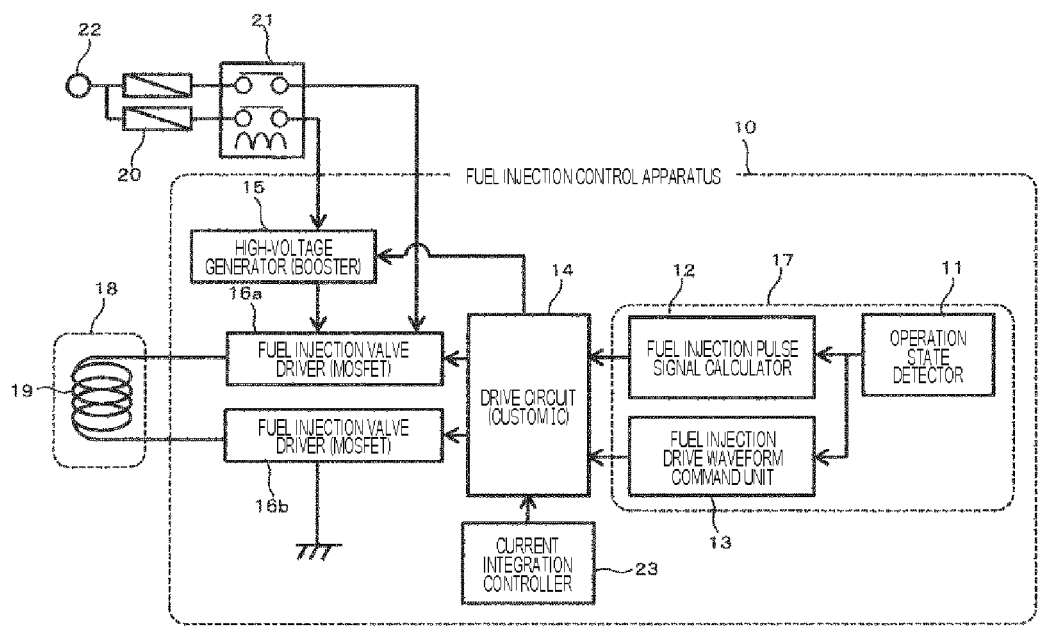
FIG. 1 is a configuration diagram illustrating a basic configuration of a fuel injection control apparatus, which forms a foundation of the present invention.

Prior to the description of the embodiments of the present invention, problems associated with the present invention will be described briefly. FIG. 1 illustrates a fuel injection control apparatus that performs half lift control and full lift control, which has a configuration that forms a foundation of the present invention.

In FIG. 1, a fuel injection control apparatus 10 includes: an operation state detector 11; a fuel injection pulse signal calculator 12; a fuel injection drive waveform command unit 13; a drive circuit (custom IC) 14; a high-voltage generator (booster) 15; and fuel injection valve drivers 16a and 16b each of which includes a metal oxide semiconductor field-effect transistor (MOSFET), for example. The operation state detector 11, the fuel injection pulse signal calculator 12, and the fuel injection drive waveform command unit 13 are included in the microcomputer 17. Of these, the fuel injection pulse signal calculator 12 and the fuel injection drive waveform command unit 13 are control functions based on a program.

The operation state detector 11 detects various types of operation information regarding, for example, the number of revolutions of an internal combustion engine, an intake air amount, a temperature of cooling water, a fuel pressure, and a failure state of the internal combustion engine. Based on the operation information obtained from the operation state detector 11, the fuel injection pulse signal calculator 12 calculates time widths of injection pulses which specify fuel injection times for electromagnetic fuel injection valves 18, and the fuel injection drive waveform command unit 13 calculates command values of drive currents flowing through electromagnetic coils 19 and outputs the command values to the drive circuit 14 in order to maintain a valve opening operations of the electromagnetic fuel injection valves 18 and their valve open states. For example, the fuel injection drive waveform command unit 13 determines a current characteristic (drive current profile), such as set current values in half lift control, and a current characteristic (drive current profile), such as set current values in full lift control, and then outputs these current characteristics to drive circuit 14.

The high-voltage generator 15, which is implemented by a DC/DC converter, generates a high power supply voltage (referred to below as a high voltage) required to open the electromagnetic fuel injection valves 18 of an electromagnetic coil type, based on a voltage of a battery power source 22 supplied via a fuse 20 and an electromagnetic relay 21. Furthermore, the high-voltage generator 15 boosts the voltage of the battery power source 22 so as to reach a desired target high voltage value, based on a command from the drive circuit 14.

Connected to an upstream end of the electromagnetic coil 19 provided in each electromagnetic fuel injection valve 18 is a fuel injection valve driver 16a, whereas connected to a downstream end of the electromagnetic coil 19 is a fuel injection valve driver 16b. The fuel injection valve driver 16a is connected to both the high-voltage generator 15 and the battery power source 22 and selectively uses, as power sources of the electromagnetic fuel injection valves 18, two voltage systems: a high voltage aiming to ensure a valve opening force of a valve body; and a battery voltage aiming to keep the valve open so that the opened valve does not close. The fuel injection valve driver 16a selectively switches the power sources so that the battery voltage is applied after the high voltage is applied during the full lift control and so that only the high voltage is applied during the half lift control.

Based on the time widths of the injection pulses calculated by the fuel injection pulse signal calculator 12 and the drive current profile calculated by the fuel injection drive waveform command unit 13, the drive circuit 14 controls the fuel injection valve drivers 16a and 16b, each of which includes a MOSFET, thereby switching between the high voltage and the battery voltage which are to be applied to the electromagnetic fuel injection valve 18 or controls the drive currents supplied to the electromagnetic fuel injection valves 18.

The drive circuit 14 is connected to a current integration controller 23, which will be described later, and receives a valve closing timing signal based on current integration when very small amounts of fuel are injected. Details will be described with reference to FIG. 3.

The above structure and operation of the fuel injection control apparatus 10 will not be described anymore because they are already known. Next, a description will be given of a method by which the current integration controller 22 compensates for variations in amounts of fuel injected via the electromagnetic fuel injection valves 18.

Figure 2:
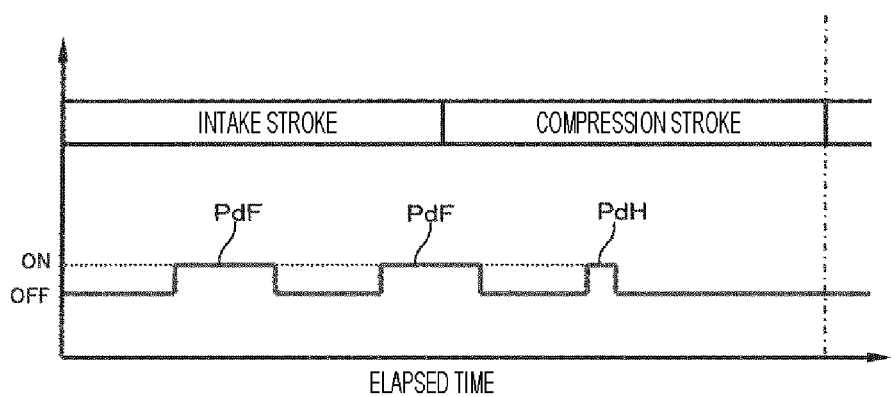
FIG. 2 is an explanatory diagram illustrating an example of a pulse string in multistage fuel injection control.

FIG. 2 illustrates a time-series application state of separated injection pulses, which are given to an electromagnetic fuel injection valve 18 in a case where the multistage injection control is performed. In the present invention, the multistage injection control illustrated in FIG. 2 will be described as a typical example, but it is not limited to this example because another method of ejecting very small amounts of fuel is conceivable.

In a four-cycle internal combustion engine of FIG. 2, one combustion cycle is formed of "intake stroke", "compression stroke", "expansion stroke", and "exhaust stroke". Injection pulses are applied to each electromagnetic fuel injection valve 18 during a period from the "intake stroke" to the "compression stroke". The full lift control in which time widths are set to be wide, as indicated by separated injection pulses PdF, is performed during the "intake stroke" and at the beginning of the subsequent "compression stroke". Then, the half lift control in which time widths are set to be narrow, as indicated by a separated injection pulse PdH, is performed in the middle of the "compression stroke".

A reason why the above separated injection is performed is that the most of target fuel amounts of fuel is injected during the "intake stroke" to form a lean, homogeneous air-fuel mixture, and then very small fuel amounts of fuel are injected during the "compression stroke" to form a partially rich mixture around a spark plug.

By forming the rich mixture around the spark plug in this manner, the ignition can be reliably turned on by the spark plug, and the lean, homogeneous mixture can be burned by the combustion flame of the rich mixture. As a result, the combustion is caused by the lean air-fuel mixture as a whole, so that the fuel efficiency and exhaust performance are improved.

The region in which the fuel is injected by the separated injection pulse PdH during the "compression stroke" corresponds to a very small fuel injection amount region of the half lift region. Thus, energy amounts of the drive currents flowing to the electromagnetic fuel injection valves 18 may differ from one another, thereby making lift amounts of the valve bodies different. As a result, variations in the amounts of fuel injected via the electromagnetic fuel injection valve 18 may occur.

To solve the above problem, integrated current values of the drive currents supplied to the electromagnetic coils 19 of the electromagnetic fuel injection valves 18 are each regulated so as to become a predetermined target integrated current value. In this way, the machine difference between the electrical characteristics of the electromagnetic fuel injection valves 18 is compensated for, and variations in fuel injection amount are thereby reduced.

Figure 3:
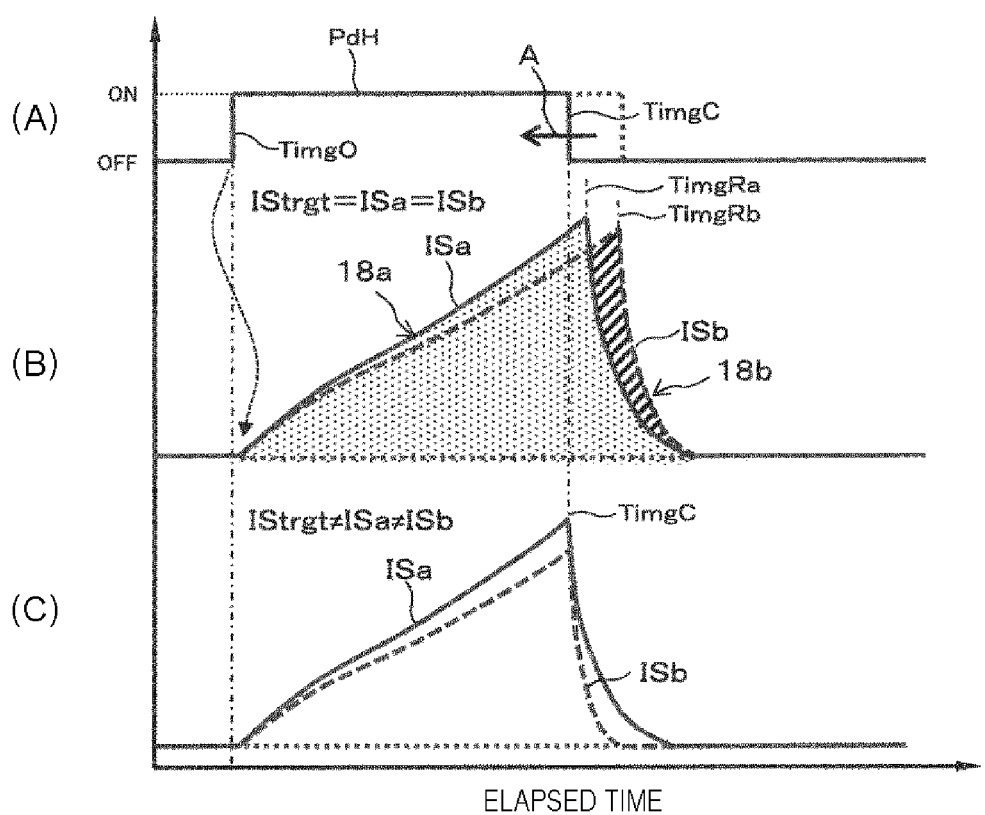
FIG. 3 is an explanatory diagram used to explain a problem that may arise when the fuel injection control apparatus illustrated in FIG. 1 performs current integration control.

The current integration control performed by the current integration controller 23 will be described with reference to FIG. 3. In FIG. 3, two electromagnetic fuel injection valves 18 are compared with each other, and the opening timings of the two electromagnetic fuel injection valves 18 are illustrated so as to coincide with each other in order to facilitate understanding. However, the electromagnetic fuel injection valve 18 operates in accordance with an operation sequence of the cylinders.

As illustrated in FIG. 3(B), when integrated current values ISa and ISb of currents supplied to electromagnetic coils 19 in two electromagnetic fuel injection valves 18a and 18b are each regulated so as to become a target integrated current value IStrgt, lift characteristics of the valve bodies in the electromagnetic fuel injection valves 18a and 18b can be regulated equally. Therefore, the variations in the fuel injection amounts can be a less serious problem.

As illustrated in FIG. 3(B), this current integration operation is performed in synchronization with a valve opening timing TimgO of the separated injection pulse PdH. When both the integrated current values ISa and ISb reach the predetermined target integrated current value IStrgt, second valve closing timings TimgRa and TimgRb are generated. Then, the drive current flowing through the electromagnetic coils 19 is interrupted, independently of a valve closing timing TimgC of the separated injection pulse PdH.

The above control is possible by appropriately setting logic of the drive circuit 14. For example, it is possible to validate one of the second valve closing timing TimgR synchronized with the timing when an integrated current value IS reaches the predetermined target integrated current value IStrgt and the first valve closing timing TimgC of the separated injection pulse PdH which has been supplied earlier to the drive circuit 14.

As illustrated in FIGS. 3(A) and 3(C), the drive current also stops flowing through the electromagnetic coil 19 at the valve closing timing TimgC of the separated injection pulse PdH. Therefore, before both the integrated current values ISa and ISb reach the predetermined target current integration threshold IStrgt, the separated injection pulse PdH is shortened, as indicated by an arrow A, due to any reason such as the execution of the pulse width correction function of the separated injection pulse PdH, and the valve closing timing TimgC is thereby generated. Then, the drive current supplied to the electromagnetic coil 19 is forcibly interrupted.

The electromagnetic fuel injection valves 18a and 18b operate in accordance with the operation sequence of the cylinders. Therefore, when the pulse width of the second separated injection pulse PdH of the electromagnetic fuel injection valve 18b is corrected in a direction of shortening with respect to the first separated injection pulse PdH of the electromagnetic fuel injection valve 18a, the above phenomenon prominently occurs. As a result, variations in fuel injection amounts newly occur, which may lead to deterioration of exhaust performance and fuel consumption efficiency.

Example 1

To deal with the above problem, a configuration of the present invention includes a fixed injection pulse generator that generates a fixed injection pulse, as an injection pulse for use in driving an electromagnetic fuel injection valve. The fixed injection pulse has a valve opening timing at which a drive current is supplied to an electromagnetic coil in the electromagnetic fuel injection valve and a first valve closing timing at which the drive current supplied to the electromagnetic coil is interrupted. The configuration further includes a drive current interruption unit that, within a period in which the fixed injection pulse is generated, determines an electric energy amount of the drive current supplied to the electromagnetic coil in response to the valve opening timing of the fixed injection pulse. When this electric energy amount reaches a preset, predetermined target electric energy amount, the drive current interruption unit generates a second valve closing timing of the fixed injection pulse different from the first valve closing timing and interrupts the drive current supplied to the electromagnetic coil before the first valve closing timing.

With the above configuration, the second valve closing timing of the fixed injection pulse is generated only after the electric energy amount given to the electromagnetic coil reaches the preset, predetermined target electric energy amount and the first valve closing timing is generated. Therefore, the electromagnetic fuel injection valve reliably shifts to the valve closing operation at a time when the electric energy amount reliably reaches the target electric energy amount, thereby suppressing variations in fuel injection amounts to improve exhaust performance and fuel efficiency performance.

Figure 4:
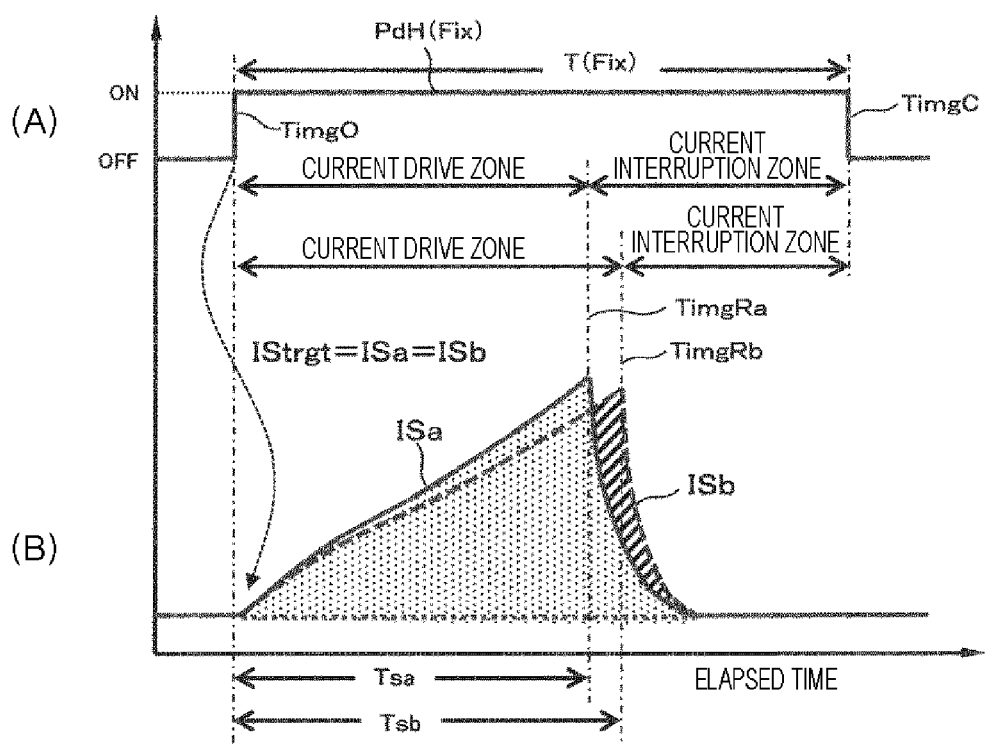
FIG. 4 is an explanatory diagram illustrating current integration control for use in solving the problem illustrated in FIG. 3.

Next, a basic concept of a first embodiment of the present invention will be described with reference to FIG. 4. In FIG. 4, two electromagnetic fuel injection valves 18 are compared with each other, but similar to FIG. 3, the opening timings of the two electromagnetic fuel injection valves 18 coincide with each other in order to facilitate understanding.

A fixed separated injection pulse PdH(Fix) illustrated in FIG. 4(A) is an injection pulse with a constant time width T(Fix) which is not corrected by a pulse width correction function. As illustrated in FIG. 4(B), the fixed separated injection pulse PdH (Fix) is set to at least a time width T(Fix) that exceeds times Tsa and Tsb in which integrated current values ISa and ISb of the drive currents flowing through the electromagnetic coils 19 in the electromagnetic fuel injection valves 18 reach a target integrated current value IStrgt.

For example, the time width T(Fix) of the fixed separated injection pulse PdH(Fix) is set to a time corresponds to a "minimum fuel injection amount" that can secure the linearity of "fuel injection amount vs injection pulse characteristic" (see FIG. 7) which is required for an internal combustion engine. The time width T(Fix) is not limited to the time corresponding to the "minimum fuel injection amount" and may also be set to another time width as required.

For example, the fixed separated injection pulse PdH (Fix) is given to the drive circuit 14 in accordance with a valve opening timing TimgO of the separated injection pulse PdH illustrated in FIG. 2. At the time when the time width T(Fix) has elapsed, a first valve closing timing TimgC is given to the drive circuit 14. In this state, an integration operation of the drive current flowing through each electromagnetic coil 19 is initiated in synchronization with the valve opening timing TimgO. Then, at the time when the integration times Tsa and Tsb at which the integrated current values ISa and ISb reach the target integrated current value IStrgt elapses, the second valve closing timings TimgRa and TinmgRb are generated. Each of the integration times Tsa and Tsb is a current drive zone in which the drive current flows through the electromagnetic coil 19, and a subsequent zone that lasts until the first valve closing timing TimgC of the fixed separated injection pulse PdH(Fix) is a current interruption zone.

After the second valve closing timings TimgRa and TinmgRb are generated, the first valve closing timing TimgC of the fixed separated injection pulse PdH(Fix) is generated. In short, both the second valve closing timings TimgRa and TinmgRb are reliably generated and supplied to the drive circuit 14 before the first valve closing timing TimgC of the fixed separated injection pulse PdH(Fix) is generated. It is thus possible to regulate each electromagnetic fuel injection valve 18 to the predetermined target integrated current value IStrgt, thereby reducing variations in fuel injection amounts caused by the machine difference between the electrical characteristics of the electromagnetic fuel injection valves 18.

As described above, the configuration of the present embodiment includes a fixed injection pulse generator that generates a fixed injection pulse PdH(Fix), as an injection pulse for use in driving an electromagnetic fuel injection valve 18. The fixed injection pulse has a valve opening timing TimgO at which a drive current is supplied to an electromagnetic coil 19 in the electromagnetic fuel injection valve 18 and a first valve closing timing TimgC at which the drive current supplied to the electromagnetic coil 19 is interrupted. The configuration further includes a drive current interruption unit that, within a period T(Fix) in which the fixed injection pulse PdH(Fix) is generated, determines an electric energy amount IS of the drive current supplied to the electromagnetic coil 19 in response to the valve opening timing TimgO of the fixed injection pulse PdH(Fix). When the determined electric energy amount reaches a preset, predetermined target electric energy amount IStrgt, the drive current interruption unit generates a second valve closing timing TimgR of the fixed injection pulse PdH(Fix) different from the first valve closing timing TimgC and interrupts the drive current supplied to the electromagnetic coil 19 before the first valve closing timing TimgC.

The target integrated current value IStrgt is determined in advance so as to correspond to the amount of fuel injected by the separated injection pulse PdH. In addition, the target integrated current value IStrgt can be determined by an adaptive method (matching) or simulation.

Next, a concrete description will be given of some embodiments of the present invention which are based on the above concept. In the embodiments described below, however, a basic configuration is identical to that of the fuel injection control apparatus illustrated in FIG. 1. Thus, the same components as those of the fuel injection control apparatus illustrated in FIG. 1 will not be described unless otherwise specified.

Figure 5:
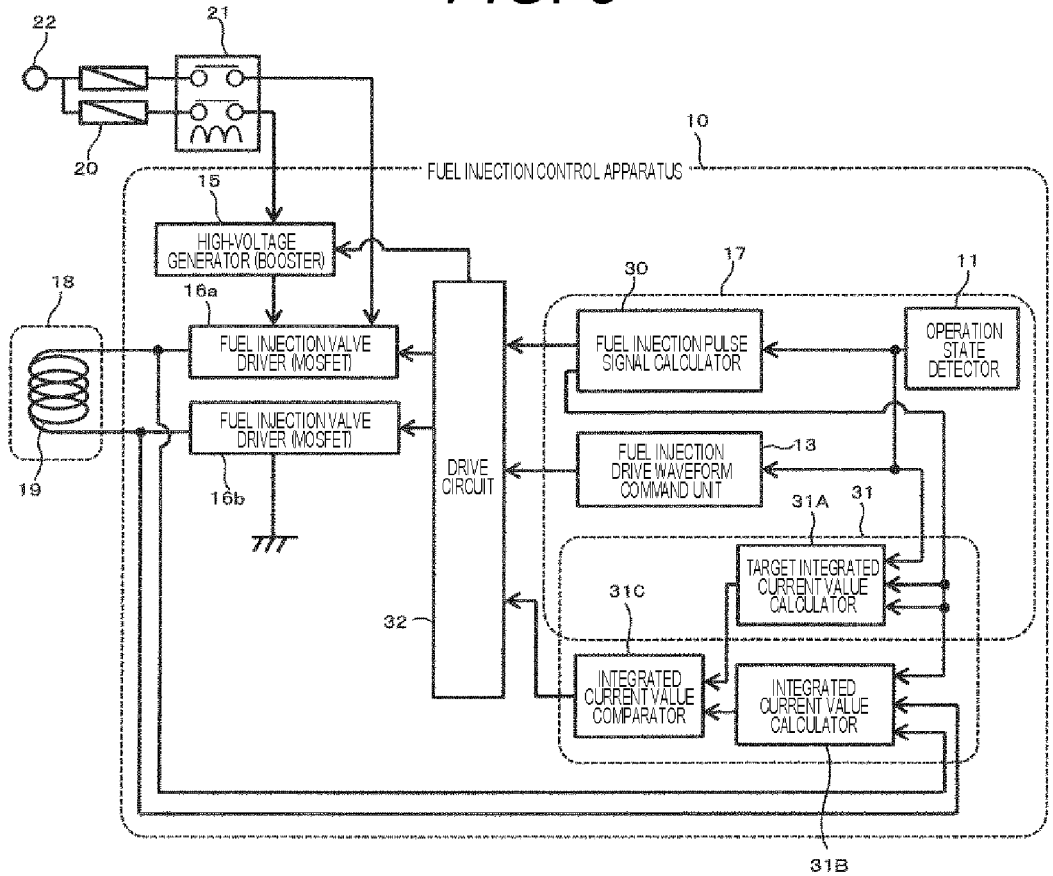
FIG. 5 is a configuration diagram illustrating a configuration of a fuel injection control apparatus according to a first embodiment of the present invention.

In FIG. 5, an operation state detector 11 detects an operation state amount representative of an operation state of an internal combustion engine and then supplies this operation state amount to a fuel injection pulse signal calculator 30 that is newly provided. This new fuel injection pulse signal calculator 30 has a function of calculating the amount of fuel injected via each electromagnetic fuel injection valve 18, a function of converting the amount of fuel into separated injection pulses PdF for the full lift control and a separated injection pulse PdH for the half lift control as illustrated in FIG. 2, and a function of selectively replacing a separated injection pulse PdH for the half lift control with the fixed separated injection pulse PdH(Fix).

In the present embodiment, as described above, a pulse converter in a separated injection pulse calculator 30A generates a pulse string containing the separated pulses PdF for full lift control of each electromagnetic fuel injection valve 18 and the subsequent separated pulse PdH for the half lift control. When the last pulse, or the separated pulse PdH, in the pulse string for the half lift control is shorter than the fixed injection pulse PdH (Fix), the pulse converter replaces this last separated pulse PdH for the half lift control with the fixed injection pulse PdH(Fix).

The fuel injection pulse signal calculator 30 supplies a drive circuit 32 with the pulse string containing the separated injection pulses PdF for the full lift control and either the separated injection pulse PdH for the half lift control or a fixed separated injection pulse PdH(Fix) for the half lift control, which are obtained by calculation. When supplying the fixed separated injection pulse PdH(Fix), the fuel injection pulse signal calculator 30 simultaneously supplies a current integration permission command and a request fuel injection amount related to the separated injection pulse PdH to a target integrated current value calculator 31A and an integrated current value calculator 31B, which constitute a current integration controller 31 that will be described below.

Figure 6:
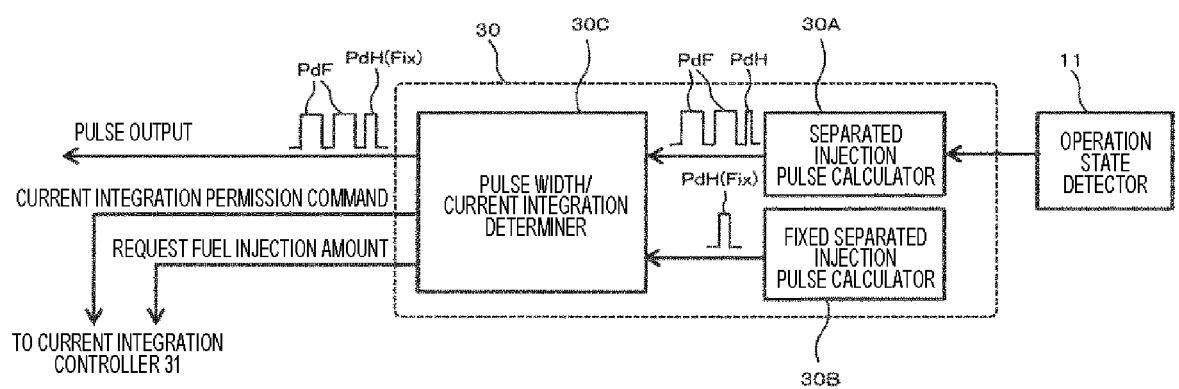
FIG. 6 is a configuration diagram illustrating a configuration of a fuel injection pulse signal calculator illustrated in FIG. 5.

FIG. 6 illustrates a schematic configuration of the above fuel injection pulse signal calculator 30. In FIG. 6, the fuel injection pulse signal calculator 30 includes the separated injection pulse calculator 30A, a fixed separated injection pulse calculator 30B, and a pulse width/current integration determiner 30C. These separated injection pulse calculator 30A, fixed separated injection pulse calculator 30B, and pulse width/current integration determiner 30C are also implemented as control functions based on a program in the microcomputer 17.

The separated injection pulse calculator 30A determines a target fuel injection amount required for one combustion cycle, based on the operation information on the internal combustion engine from the operation state detector 11. Then, based on the target fuel injection amount, the separated injection pulse calculator 30A calculates injection pulses for use in separately injecting the fuel a plurality of time.

For example, the separated injection pulse calculator 30A calculates the separated injection pulse string, as illustrated in FIG. 2. In this case, the pulse string contains the separated injection pulses PdF for the full lift control and the separated injection pulse PdH for the half lift control is generated.

The fixed separated injection pulse calculator 30B, when the current integration control is performed in the above manner, generates the fixed separated injection pulse PdH (Fix) that has a function of preventing the drive current flowing through each electromagnetic coil 19 from being interrupted before the second valve closing timing TimgR due to a varying first valve closing timing TimgC of the separated injection pulse PdH. The fixed separated injection pulse PdH(Fix) is stored in a storage device such as a table and is read when the pulse width/current integration determiner 30C, which will be described later, performs a comparison operation of the separated injection pulse PdH.

Figure 7:
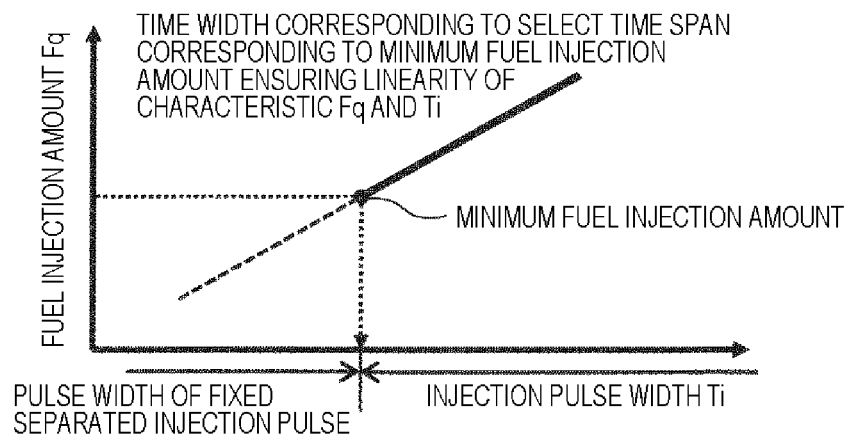
FIG. 7 is a characteristic diagram of a fuel injection amount and an injection pulse, which is used to explain a relationship between the fuel injection amount and the injection pulse.

The fixed separated injection pulse PdH(Fix) functions as a "comparison pulse". As illustrated in FIG. 7, the fixed separated injection pulse PdH(Fix) is set to a time width corresponding to the "minimum fuel injection amount" that ensures the linearity of the flow amount characteristic of the fuel injection amount (Fq) and the injection pule width (Ti). Thus, if the fixed separated injection pulse PdH(Fix) is narrower than this time width, the characteristic enters into a region where a very small amount of fuel is injected, varying the fuel injection amounts caused by the machine difference between the electromagnetic fuel injection valves 18. In this state, it is necessary to perform the current integration control to suppress the variations in the fuel injection amounts caused by the machine difference between the electromagnetic fuel injection valves 18.

The pulse width/current integration determiner 30C is provided with a "pulse comparator", which receives the separated injection pulses PdF and PdH from the separated injection pulse calculator 30A and the fixed separated injection pulse PdH(Fix) from the fixed separated injection pulse calculator 30B. Then, the pulse comparator compares the individual pulse widths of these injection pulses, thereby determining whether to perform the current integration control.

In the present embodiment, as described above, the pulse width of the comparison pulse to be compared by the pulse comparator in the pulse width/current integration determiner 30C is set to a time width corresponding to the "minimum fuel injection amount" that ensures the linearity of the flow rate characteristic of the fuel injection amount and the injection pulse width.

In this pulse width comparison method, the fixed separated injection pulse PdH(Fix) and the separated injection pulses PdF and PdH may be compared in order. Alternatively, in another method, the last separated injection pulse PdH and the fixed separated injection pulse PdH(Fix) may be compared if the separated injection pulse PdH for the half lift control is known. This is because in the pulse string illustrated in FIG. 2, the last injection pulse corresponds to the separated injection pulse PdH. Any of the methods may be employed; however, in terms of control responsiveness, the separated injection pulse PdH, which is known in advance as a separated injection pulse for the half lift control, is preferably compared with the fixed separated injection pulse PdH(Fix).

The pulse width/current integration determiner 30C compares at least the pulse widths of the separated injection pulse PdH for the half lift control from the separated injection pulse calculator 30A and the fixed separated injection pulse PdH(Fix) from the fixed separated injection pulse calculator 30B. Then, when determining that the pulse width of the separated injection pulse PdH for the half lift control is wider than that of the fixed separated injection pulse PdH(Fix), the pulse width/current integration determiner 30C outputs the pulse string determined by the separated injection pulse calculator 30A to the drive circuit 32 without performing any processing. It is obvious that the pulse width/current integration determiner 30C does not perform the current integration control.

When it is determined that the pulse width of the separated injection pulse PdH for the half lift control is narrower than the pulse width of the fixed separated injection pulse PdH(Fix), the "pulse converter" provided in the pulse width/current integration determiner 30C replaces the separated injection pulse PdH determined by the separated injection pulse calculator 30A with the fixed separated injection pulse PdH(Fix). Then, the pulse width/current integration determiner 30C outputs the resultant pulse string to the drive circuit 32.

In the present embodiment, as described above, the pulse width of the comparison pulse is set to the same as the pulse width of the fixed injection pulse PdH(Fix).

In the pulse string of FIG. 6 output from the pulse width/current integration determiner 30C, the separated injection pulse PdH has been replaced by the fixed separated injection pulse PdH(Fix). In this case, it is obvious that the valve opening timing TimgO of the fixed separated injection pulse PdH(Fix) is set to so as to coincide with the valve opening timing TimgO of the separated injection pulse PdH for the half lift control.

As described above, the configuration of the present embodiment includes the separated injection pulse calculator 30A that forms a plurality of separated injection pulses by dividing a target fuel injection amount required for one combustion cycle by a predetermined separation number. The configuration further includes a pulse comparator that compares the pulse widths of the separated injection pulse and one or more preset, predetermined comparison pulses. The configuration further includes a pulse converter that, when the pulse comparator determines that the separated injection pulse is narrower, replaces the separated injection pulse determined to be narrower with the fixed injection pulse from the fixed injection pulse generator.

Simultaneously with the above, when it is determined that the pulse width of the separated injection pulse PdH for the half lift control is shorter than that of the fixed separated injection pulse PdH(Fix), the pulse width/current integration determiner 30C outputs the current integration permission command and the request fuel injection amount corresponding to the separated injection pulse PdH for the half lift control. The request fuel injection amount is given to the target integrated current value calculator 31A, and the current integration permission command is given to both the target integrated current value calculator 31A and the current integration calculator 31B. As a result, the current integration controller 31 is activated. Herein, the current integration controller 31 functions as a "drive current interruption unit".

The current integration controller 31 includes the target integrated current value calculator 31A, the integrated current value calculator 31B, and an integrated current value comparator 31C. The target integrated current value calculator 31A is implemented as a control function based on the program of the microcomputer 17. Although both of the integrated current value calculator 31B and the integrated current value comparator 31C are implemented in hardware, they can be replaced with the control function of the microcomputer as needed.

The target integrated current value calculator 31A is activated in response to the current integration permission command from the fuel injection pulse signal calculator 30. Then, the target integrated current value calculator 31A calculates the request fuel injection amount depending on the separated injection pulse PdH that has been determined by the fuel injection pulse signal calculator 30. The target integrated current value IStrgt is thereby determined depending on the request fuel injection amount.

Figure 8:
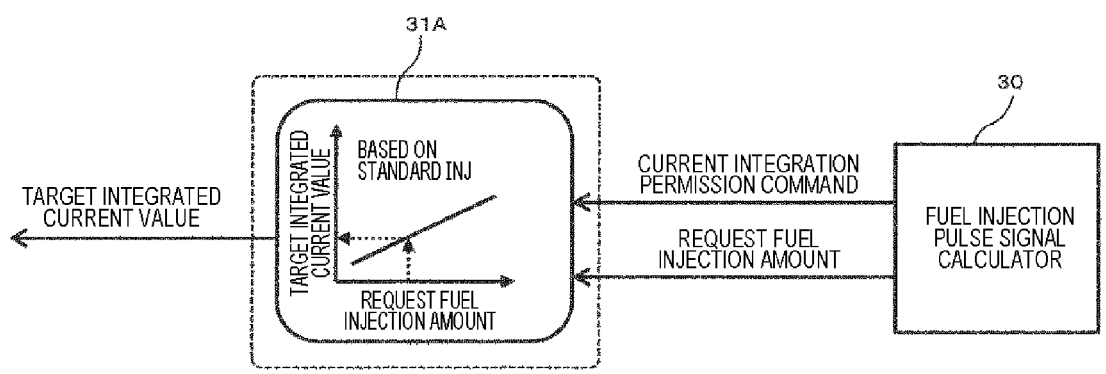
FIG. 8 is a configuration diagram illustrating a configuration of a target integrated current value calculator illustrated in FIG. 5.

FIG. 8 illustrates a configuration of the target integrated current value calculator 31A. The target integrated current value calculator 31A has a map in which a horizontal axis represents the request fuel injection amount and a vertical axis represents the target integrated current value. The target integrated current value calculator 31A receives the current integration permission command and the request fuel injection amount from the fuel injection pulse calculator 30. Thus, when receiving the current integration permission command, the target integrated current value calculator 31A searches the map for the target integrated current value IStrgt corresponding to the request fuel injection amount and then outputs the target integrated current value IStrgt to the integrated current value comparator 31C.

The target integrated current value IStrgt is determined in advance by using a standard (reference) electromagnetic fuel injection valve and by a suitable method (matching) or simulation, and in relation to the request fuel injection amount corresponding to the separated injection pulse PdH. In this case, the target integrated current value IStrgt is set to a target integrated current value IStrgt that is smaller than the target integrated current value depending on the fuel injection amount corresponding to the fixed separated injection pulse PdH(Fix) and stored in the map. Since the calculation is performed by the map search, the calculation time can be shortened as compared with the arithmetic calculation, which contributes to the control with good responsiveness.

In the present embodiment, as described above, the target integrated value IStrgt is determined from the map that stores the target integrated current value corresponding to the request fuel injection amount determined in advance in the standard electromagnetic fuel injection valve.

The integrated current value calculator 31B is activated in response to the current integration permission command from the fuel injection pulse signal calculator 30. More specifically, the integrated current value calculator 31B is activated in synchronization with the valve opening timing TimgO of the fixed separated injection pulse PdH(Fix). Then, the integrated current value calculator 31B detects the drive current flowing through the electromagnetic coil 19 in each electromagnetic fuel injection valve 18 and performs the current integration operation. The valve opening timing TimgO of the fixed separated injection pulse PdH(Fix) coincides with the valve opening timing TimgO of the separated injection pulse PdH.

In this way, the start timing of the integration operation is synchronized with the valve opening timing TimgO of the fixed separated injection pulse PdH(Fix). This integrated current value is output to the integrated current value comparator 31C.

Next, an operation of the integrated current value comparator 31C will be described with reference to FIG. 4. The integrated current value comparator 31C compares the target integrated current value IStrgt determined by the target integrated current value calculator 31A with the integrated current values ISa and ISb that are integrated momently by the integrated current value calculator 31B. When the relationship IStrgt=ISa=ISb is satisfied, the integrated current value comparator 31C outputs valve closing signals of the second valve closing timings TimgRa and TimgRb to the drive circuit 32. As described above, the valve closing signals with the second valve closing timings TimgRa and TimgRb are supplied to the drive circuit 32 earlier than the valve closing signal of the first valve closing timing TimgC of the fixed separated injection pulse PdH(Fix). Therefore, the second valve closing timing TimgR of the current integration control is regarded as being effective earlier than the first valve closing timing TimgC of the fixed separated injection pulse PdH(Fix).

In the present embodiment, as described above, the drive circuit 32 validates a valve closing timing that is one of the first valve closing signal based on the first valve closing timing TimgC and the second valve closing signal based on the second valve closing timing TimgR which has been supplied earlier to the drive circuit 32.

In the present embodiment, the drive current interruption unit (current integration controller 31) determines the integrated current value of the drive current supplied to each electromagnetic coil 19 in synchronization with the valve opening signal TimgO. Then, when the determined integrated current value reaches the preset, predetermined target integrated current value IStrgt, the drive current interruption unit supplies the drive circuit with the second valve closing signal based on the second valve closing timing TimgR.

The drive circuit 32 controls the gates of the MOSFETs forming the fuel injection valve drivers 16a and 16b in response to injection pulses transmitted from the fuel injection pulse signal calculator 30.

When the full lift control is performed, the drive circuit 32 simultaneously turns on the fuel injection valve drivers 16a and 16b in synchronization with the valve opening timing TimgO of the separated injection pulse PdF and, in turn, simultaneously turns off the fuel injection valve drivers 16a and 16b in synchronization with the first valve closing timing TimgC.

When the half lift control is performed and the pulse width of the separated injection pulse PdH is wider than the pulse width of the fixed separated injection pulse PdH(Fix), the drive circuit 32 simultaneously turns on the fuel injection valve drivers 16a and 16b in synchronization with the valve opening timing TimgO of the separated injection pulse PdH that has not been replaced by the fixed separated injection pulse PdH(Fix) and, in turn, simultaneously turns off the fuel injection valve drivers 16a and 16b in synchronization with the first valve closing timing TimgC. When the pulse width of the separated split injection pulse PdH is wider than the pulse width of the fixed separated injection pulse PdH(Fix) as described above, the linearity is ensured as illustrated in FIG. 7 and thus variations in the fuel injection amounts can be a less serious problem.

When the half lift control is performed and the separated injection pulse PdH is narrower than the fixed separated injection pulse PdH(Fix), the linearity is not ensured as illustrated in FIG. 7, and thus variations in the fuel injection amounts can turn out to be a problem, in which case the current integration control is performed. In this case, since the pulse width of the separated injection pulse PdH is narrower than the pulse width of the fixed separated injection pulse PdH(Fix), the separated injection pulse PdH is first replaced with the fixed separated injection pulse PdH (Fix).

Then, the drive circuit 32 simultaneously turns on the fuel injection valve drivers 16a and 16b in synchronization with the valve opening timing TimgO of the fixed separated injection pulse PdH(Fix) and, in turn, simultaneously turns off the fuel injection valve drivers 16a and 16b in synchronization with the second valve closing timing TimgR from the current integration controller 31. After that, although the drive circuit 32 receives the first valve closing timing TimgC of the fixed separated injection pulse PdH(Fix), it invalidates the first valve closing timing TimgC.

In the present embodiment, as described above, the fixed injection pulse generator 30B supplies the drive circuit 32 with the valve opening signal based on the valve opening timing TimgO and the first valve closing signal based on the first valve closing timing TimgC. In response to the valve opening signal, the drive circuit 32 supplies the drive current to each electromagnetic coil 19. In response to the valve opening signal, the drive current interruption unit (current integration controller) 31 determines the electric energy amount of the drive current supplied to each electromagnetic coil 19. When the determined electric energy amount reaches a preset, predetermined target electric energy amount, the drive current interruption unit 31 supplies the drive circuit 32 with the second valve closing signal based on the second valve closing timing TimgR, thereby interrupting the drive current supplied to each electromagnetic coil.

In the present embodiment, the drive current interruption unit (current integration controller) 31 includes the integrated current value calculator 31B, the target integrated current value calculator 31A, and the current integration comparator. The integrated current value calculator 31B determines the integrated current value of the drive current supplied to each electromagnetic coil 19 in synchronization with the valve opening signal. The target integrated current value calculator 31A determines a target integrated current value corresponding to the request fuel injection amount injected from the electromagnetic fuel injection valve 18. The current integration comparator generates the second valve closing signal to supply the second valve closing signal to the drive circuit at the time when the integrated current value reaches the target integrated current value.

An effect of simultaneously turning off the fuel injection valve drivers 16a and 16b will be described. When the fuel injection valve drivers 16a and 16b are simultaneously turned off, a negative counter electromotive force having the same level as the high voltage applied to each electromagnetic coil 19 is generated, swiftly returning the drive current to zero. This shortens the period in which the drive current generates residual magnetism, minimizing the magnetic force that may influence the behavior of each valve body. As a result, the unstable operation immediately after the valve body reaches the predetermined lift becomes a stable operation, and the accuracy of the fuel injection amount is thereby improved.

As illustrated in FIG. 4, during the current integration control, the current drive zone is reserved between the valve opening timing TimgO at which the drive current is supplied to each electromagnetic coil 19 and the second valve closing timing TimgR at which the integrated current value reaches the target integrated current value IStrgt and the drive current is interrupted. After the second valve closing timing TimgR, a zone in which counter electromotive force rapidly reduces the drive current is reserved and is contained in a current interruption zone.

The pulse width of the fixed separated injection pulse PdH(Fix) is set to the sum of the current drive zone and the current interruption zone containing the zone in which the counter electromotive force rapidly reduces the drive current. In short, the pulse width of the fixed separated injection pulse PdH(Fix) is wider than the time span in which the drive current is supplied to each electromagnetic coil 19, interrupted, and converges to zero.

In the present embodiment, as described above, the pulse width of the fixed injection pulse PdH(Fix) is set to be wider than the time span in which the drive circuit 32 supplies the drive current to each electromagnetic coil 19 and interrupts the drive current according to the second valve closing signal TimeR, which then converges to zero.

Since the pulse width of the fixed separated injection pulse PdH(Fix) is set to be the same as the pulse width of the comparison pulse for use in determining whether the current integration controller 31 performs the current integration control. Therefore, after the current integration control is performed, the first valve closing timing TimgC of the fixed separated injection pulse PdH(Fix) is generated. As a result, it is possible to reliably obtain the second valve closing timing TimgR from the current integration controller 31, thereby successfully suppressing variations in the fuel injection amounts caused by the machine difference between the electrical components of the electromagnetic fuel injection valves. The pulse width of fixed separated injection pulse PdH(Fix) may be set to a plurality of pulse widths other than the pulse width described above.

Next, a description will be given of a control flow in the case where the above control is performed by a microcomputer.

Figure 9:
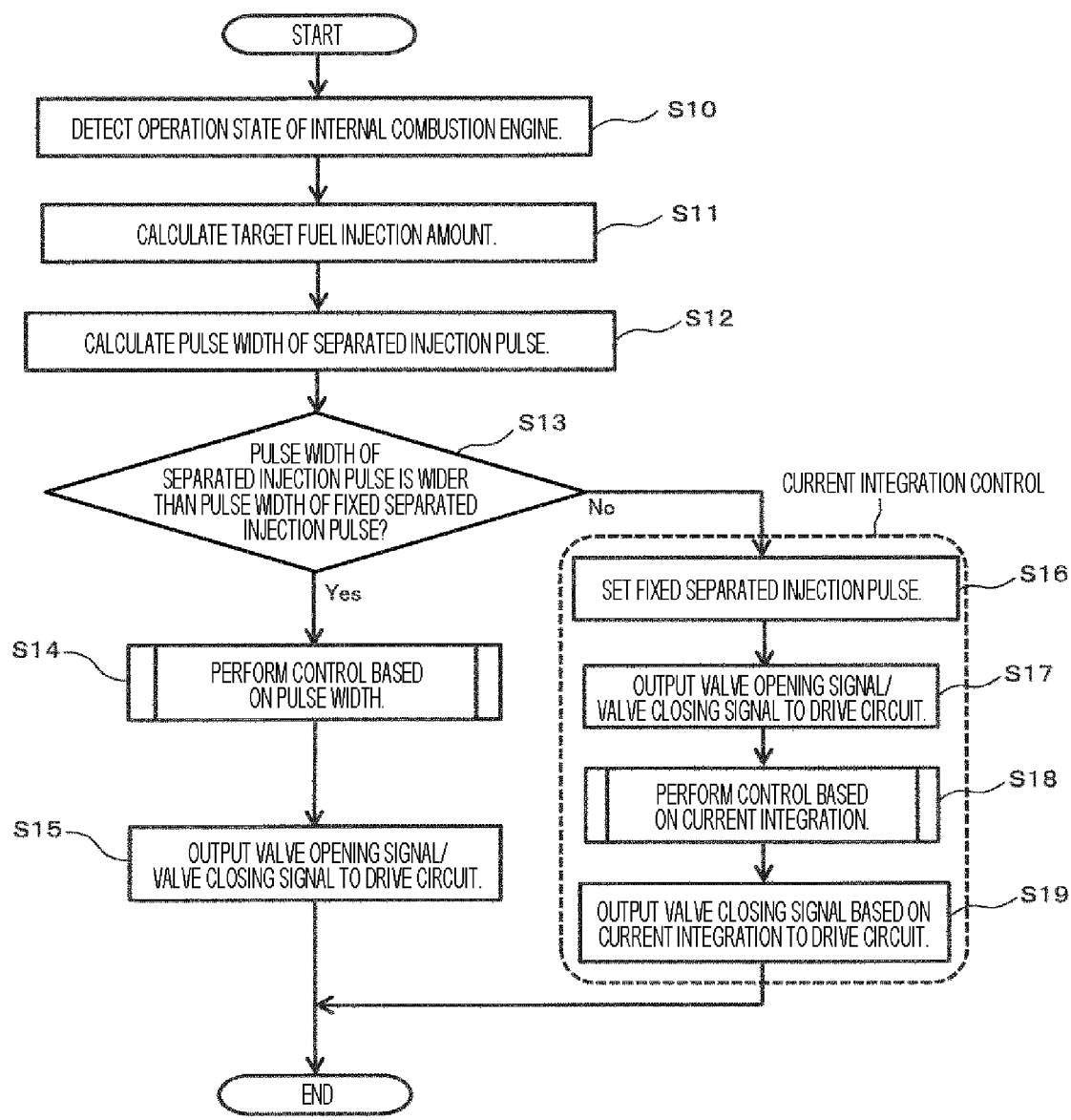
FIG. 9 is a flowchart illustrating a control flow in a case where the current integration control according to the first embodiment of the present invention is performed by a microcomputer.

FIG. 9 is a flowchart of a mode in which the fuel is injected under pulse width control in a region where linearity can be ensured illustrated in FIG. 7 and a mode in which the fuel is injected under the current integration control in a region where linearity cannot be secured. In FIG. 2, for example, the preceding two separated injection pulses PdF determine a fuel injection amount under the pulse width control, whereas the fixed separated injection pulse PdH (Fix) following the separated injection pulses PdF determines a fuel injection amount under the current integration control.

<<Step S10>> In step S10, various types of operation information regarding the number of revolutions of the internal combustion engine, the amount of intake air, a temperature of the cooling water, a fuel pressure, and a failure state of the internal combustion engine, for example, are detected. This operation information is used to determine a target fuel injection amount or the separated number of injection pulses, for example. After the operation information on the internal combustion engine is detected, the process proceeds to step S1.

<<Step S11>> In step S1, from the detected operation information, the target fuel injection amount or the separated number of injection pulses are determined. The target fuel injection amount is obtained by multiplying a basic fuel injection amount by various correction coefficients, the basic fuel injection amount being obtained by dividing the air amount by the number of the revolutions. Further, the separated number is determined in accordance with variables such as a load, an air amount, and the number of revolutions, and a valve opening timing at which the fuel injection starts in response to the separated injection pulse is also determined together. In this way, when the target fuel injection amount, the separated number, the valve opening timing, for example, are determined in step S1, the process proceeds to step S12.

<<Step S12>> In step S12, based on the target fuel injection amount, the separated number, and the valve opening timing, for example, pulse widths of the separated injection pulses are determined.

In the present embodiment, for example, the pulse widths are determined in a manner similar to the way that the two separated injection pulses PdF and one separated injection pulse PdH following the separated injection pulses PdF in FIG. 2 are determined. This control amount is determined before the fuel is injected in response to the first separated injection pulse. Then, in the "intake stroke" and at the beginning of the subsequent "compression stroke", the fuel is injected twice in response to the separated injection pulses PdF. In the middle of the "compression stroke", the fuel is injected once in response to the separated injection pulse PdH.

In the present embodiment, as described above, the separated injection pulse calculator 30A calculates the pulse string before the fuel is injected in response to the first separated injection pulse PdF.

A reason why the above separated injection is performed is that the most of target fuel amounts of fuel is injected during the "intake stroke" to form a lean, homogeneous air-fuel mixture, and then very small fuel amounts of fuel are injected during the "compression stroke" to form a partially rich mixture around a spark plug.

This injection pattern is a typical example; however, it is obvious that the injection pattern may include a plurality of separated injection pulses with the same pulse width. After the pulse widths of the separated injection pulses are determined, the process proceeds to step S13.

<<Step S13>> In step S13, each of the pulse widths of the separated injection pulses PdF and PdH is compared with the fixed separated injection pulse PdH(Fix). In this case, the preceding two separated injection pulses PdF are used for the full lift and thus their pulse width is reliably wider than that of the fixed separated injection pulse PdH(Fix). Thus, the process proceeds to step S14 in which the control is performed based on the pulse width.

The separated injection pulse PdH following the preceding separated injection pulse PdF is used for the operation of the half lift, in which cases its pulse width may be longer or shorter than the fixed separated injection pulse PdH(Fix).

When the pulse width of the separated injection pulses PdH is wider than that of the fixed separated injection pulse PdH(Fix), the linearity of the electromagnetic fuel injection valve is ensured. Therefore, the process proceeds to step S14 in which control is performed based on the pulse width. When the pulse width of the separated injection pulses PdH is narrower than that of the fixed separated injection pulse PdH(Fix), the linearity of the electromagnetic fuel injection valve is not ensured. Therefore, the process proceeds to step S16 in which control is performed based on the current integration.

In the above case, each of the separated injection pulses PdF and PdH is compared with the pulse width of the fixed separated injection pulse PdH(Fix). However, the separated injection pulses PdF do not necessarily to be compared with the fixed division injection pulse PdH(Fix), in other words, only the separated injection pulse PdH may be compared with the fixed division injection pulse PdH(Fix). This is because it is already known that the separated injection pulses PdF are used for the full lift control.

<<Step S14>> In step S14, various electronic control components are controlled in order to perform the control based on the pulse width. For example, the valve opening timing TimgO and the valve opening time (pulse width) are set for an output register in an input/output circuit (IO/LSI). After those control amounts are set, the process proceeds to step S15. Those setting steps may be individually performed in relation to the separated injection pulses PdF and PdH.

<<Step S15>> In Step S15, based on the valve opening timing TimgO and the valve opening time (pulse width) set for the output register in the input/output circuit (IO/LSI), a valve opening signal and a valve closing signal are output to the drive circuit 32 in response to the separated injection pulses PdF and PdH. The above steps S11 to S15, in which the control is performed based on a normal pulse width, will not be described anymore.

<<Step S16>> The process returns to step S13, in which the pulse width of each of the separated injection pulses PdF and PdH is compared with that of the fixed separated injection pulse PdH(Fix). Then, when, of the separated injection pulse group, only the separated injection pulse PdH is narrower than the fixed injection pulse PdH(Fix), the linearity of the electromagnetic fuel injection valve is not ensured. Therefore, step S16 in which the control is performed based on the current integration is performed.

In step S16, instead of the separated injection pulse PdH, the fixed separated injection pulse PdH(Fix) whose valve opening timing coincides with the valve opening timing TimgO of the separated injection pulse PdH is set for the output register in the input/output circuit (IO/LSI). The fixed separated injection pulse PdH(Fix) has a function of preventing the drive current flowing through each electromagnetic coil 19 from being interrupted by the current integration control before the second valve closing timing TimgR, as described above.

As described above, the fixed separated injection pulse PdH(Fix) is set to a time width corresponding to the "minimum fuel injection amount" that ensures the linearity of the flow amount characteristic of the fuel injection amount (Fq) vs the injection pule width (Ti). After the valve opening timing TimgO and the valve opening time (pulse width) of the fixed separated injection pulse PdH(Fix) are set for the output register in the input/output circuit (IO/LSI), the process proceeds to step S17.

In the present embodiment, as illustrated in FIG. 2, the number of separated fuel injections is preset (e.g., three times), and the pulse width of the last separated injection pulse PdH for one combustion cycle is at least replaced with the fixed separated injection pulse PdH(Fix). As a result, a rich air-fuel mixture can be formed in a small fuel injection amount around the spark plug, thus successfully and reliably turning on the ignition of the spark plug.

<<Step S17>> In Step S17, based on the valve opening timing and the valve opening time (pulse width) set for the output register in the input/output circuit (IO/LSI) and in relation to the fixed separated injection pulse PdH(Fix), the valve opening signal and the valve closing signal are output to the drive circuit 32 in synchronization with the valve opening timing TimgO and the first valve closing timing TimgC as illustrated in FIG. 4. After the valve opening signal (valve opening timing TimgO) is output in step S17, the process proceeds to step S18.

<<Step S18>> In step S18, the control is performed based on the current integration. This control is performed in accordance with the control flow illustrated in FIG. 10, and detailed control will be described with reference to FIG. 10. Then, when the current integration control is performed and then the valve closing timing is output, the process proceeds to step S19.

<<Step S19>> In step S19, the valve closing signal is output to the drive circuit 32 in synchronization with the second valve closing timing TimgR output under the current integration control. In synchronization with the second valve closing timing TimgR, the drive circuit 32 simultaneously turns off the fuel injection valve drivers 16a and 16b. After that, the drive circuit 32 receives the valve closing signal in synchronization with the first valve closing timing TimgC of the fixed separated injection pulse PdH(Fix) as a result of the execution of step S17. However, the drive circuit 32 invalidates this valve closing signal based on the first valve closing timing TimgC because it already receives the valve closing signal based on the second valve closing timing TimgR. This can reliably perform the fuel injection control under the current integration control.

In the present embodiment, as described above, the drive circuit 32 validates the valve closing timing that is one of the first valve closing signal based on the first valve closing timing TimgC and the second valve closing signal based on the second valve closing timing TimgR which has been supplied earlier to the drive circuit 32.

In the above embodiment, the last separated injection pulse PdH is used for the half lift control, and this last separated injection pulse PdH is replaced with the fixed separated injection pulse PdH(Fix). However, it can be considered that a separated injection pulse when the separated injection amount is less than or equal to a predetermined value, a separated injection pulse when the number of separated injections is greater than or equal to a predetermined value, or a separated injection pulse when the injection start timing or the injection completion timing is later than the predetermined timing is used for the half lift control. In those cases, therefore, the separated injection pulse can be replaced with the fixed separated injection pulse PdH(Fix) as in the control step described above. It is obvious the separated injection pulse used for the half lift control is compared with the fixed separated injection pulse PdH(Fix).

In the present embodiment, as described above, the separated injection pulse calculator 30A considers that the separated injection pulse when the number of separated injections is equal to or greater than the predetermined number or the separated injection pulse when the valve opening timing or the injection completion timing of the electromagnetic fuel injection valve is later than a predetermined timing is used for the half lift control. Thus, when the pulse comparator and the pulse converter determine that the divided pulse is narrower than the fixed injection pulse, the separated pulse can be replaced with the fixed injection pulse.

Figure 10:
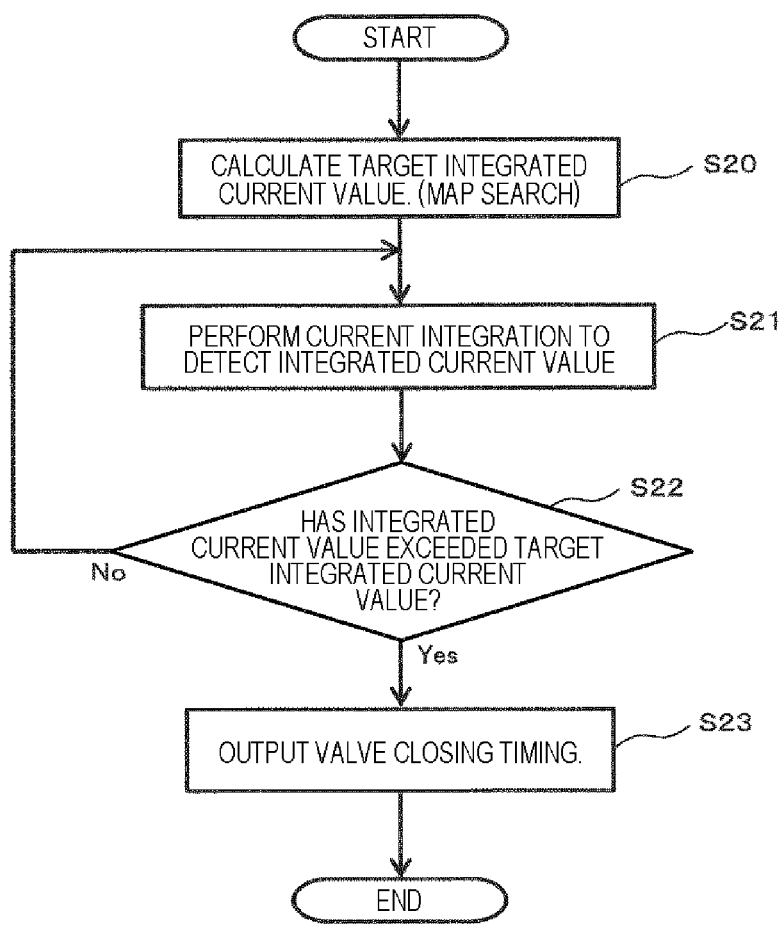
FIG. 10 is a flowchart illustrating details of the current integration control illustrated in FIG. 9.

Next, details of the current integration control in step S18 will be described with reference to FIG. 10.

<<Step S20>> In step S20, the target integrated current value IStrgt corresponding to the request fuel injection amount is found from the map in which the horizontal axis represents the request fuel injection amount and the vertical axis represents the target integrated current value. In this case, the request fuel injection amount refers to a request fuel injection amount corresponding to the separated injection pulse PdH, and this request fuel injection amount is a very small fuel injection amount to be influenced by the machine difference between the electromagnetic fuel injection valves. Therefore, it is necessary to suppress the machine difference influence by using the current integration control. After the target integrated current value IStrgt is determined through the map search, the process proceeds to step S21.

<<Step S21>> In step S21, the drive current flowing through the electromagnetic coil 19 in each electromagnetic fuel injection valve is subjected to time integration in synchronization with the valve opening timing TimgO of the fixed separated injection pulse PdH(Fix). This integrated current value represents the amount of electric energy supplied to each electromagnetic coil 19. By regulating this integrated current value so as to become the target integrated current value, the influence of machine differences between the electrical components of the electromagnetic fuel injection valve can be reduced. After the integrated current value is completely calculated, the process proceeds to step S22.

<<Step S22>> In step S22, the target integrated current value determined in step S21 is compared with the momently increased integrated current value determined in step S22. When the integrated current value has not yet reached the target integrated current value, the control steps in steps S21 and S22 are performed again. When the integrated current value has reached the target integrated current value, it is considered that the target electric energy amount has been supplied to each electromagnetic coil 19. Then, the process proceeds to step S23.

<<Step S23>> In step S23, since the target electric energy amount is considered to be supplied to each electromagnetic coil 19, the second valve closing timing TimgR is output. It should be noted that, as described above, the target electric energy amount has a substantially equivalent relationship with the request fuel injection amount corresponding to the separated injection pulse PdH. The second valve closing timing TimgR is output to the drive circuit 32 as a valve closing signal in step S19 of FIG. 9 to simultaneously turns off the fuel injection valve drivers 16a and 16b.

As described above, a configuration of the present embodiment includes a separated injection pulse calculator 30A that forms a plurality of separated injection pulses PdF and PdH by dividing a target fuel injection amount required for one combustion cycle by a predetermined separated number. The configuration further includes a pulse converter that compares a pulse width of a separated injection pulse with that of a preset, predetermined fixed separated injection pulse PdH(Fix). When the separated injection pulse is narrower, the pulse converter replaces the narrower separated injection pulse with fixed separated injection pulse PdH (Fix). The configuration further includes a current integration controller 31 that, within a period T(Fix) in which the fixed separated injection pulse PdH(Fix) is generated, determines an integrated current value IS of a drive current supplied to an electromagnetic coil 19 in synchronization with a valve opening timing TimgO of the fixed separated injection pulse PdH(Fix). When the determined integrated current value IS reaches a preset, predetermined target integrated current value IStrgt, the current integration controller 31 generates a valve closing timing earlier than a valve closing timing TimgC of the fixed separated injection pulse PdH(Fix). The configuration further includes a drive circuit 32 that supplies the drive current to the electromagnetic coil in synchronization with a valve opening timing of a fixed separated injection pulse and interrupts the drive current supplied to the electromagnetic coil in synchronization with a valve closing timing that is an earlier one of a valve closing timing TimeC based on the fixed separated injection pulse PdH(Fix) and a valve closing timing TimgR from the current integration controller 31.

According to the present embodiment, as described above, an integrated value of a drive current supplied to the electromagnetic coil 19 in the electromagnetic fuel injection valve is determined in synchronization with a valve opening timing of a fixed injection pulse with a predetermined constant time width. When this integrated current value reaches a preset, predetermined target integrated current value, a valve closing timing is generated to interrupt the drive current supplied to the electromagnetic coil 19. A pulse closing timing of the fixed injection pulse is generated only after the drive current is interrupted.

According to the above, a valve closing timing of a fixed injection pulse is generated only after an integrated current value given to the electromagnetic coil 19 reaches a preset, predetermined target integrated current value. Thus, at a time when the integrated current value reliably reaches a target integrated current value, the electromagnetic fuel injection valve always shifts to a valve closing operation. This can suppress variations in fuel injection amounts, thereby successfully improving exhaust performance and fuel efficiency performance.

Example 2

Next, a second embodiment of the present invention will be described with reference to FIGS. 11 to 14. The foregoing first embodiment employs a system in which a target integrated current value is compared with an actual integrated current value. Then, when both the integration values coincide with each other, a valve closing signal is generated. The second embodiment, however, proposes a system in which an integrated current value comparator is not provided.

Figure 11:
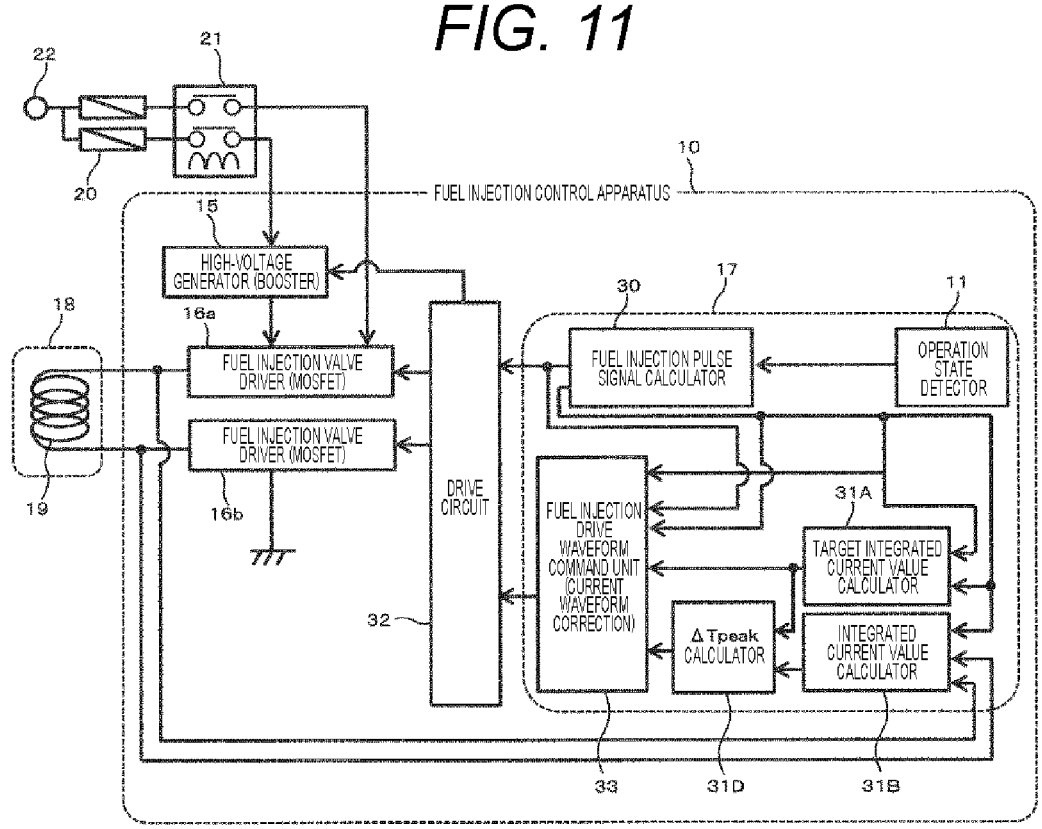
FIG. 11 is a configuration diagram illustrating a configuration of a fuel injection control apparatus according to a second embodiment of the present invention.

Since a fuel injection control apparatus illustrated in FIG. 11 is basically based on the configuration of the first embodiment, the same components as those illustrated in FIG. 5 will not be described.

In FIG. 11, a ΔTpeak calculator 31D is newly provided instead of the integrated current value comparator 31C. The ΔTpeak calculator 31D has a function of determining a time difference between a target arrival time and an actual arrival time. The target arrival time refers to a time until an integrated current value reaches a target integrated current value IStrgt when a standard (reference) electromagnetic fuel injection valve is used. The actual arrival time refers to a time until an integrated current value for an actual electromagnetic fuel injection valve 18 reaches the target integrated current value IStrgt. This time difference represents a machine difference between electromagnetic fuel injection valves.

The time difference determined by the ΔTpeak calculator 31D is transmitted to a fuel injection drive waveform command unit 33, and then a valve closing timing for current integration control is determined. Herein, the ΔTpeak calculator 31D and the fuel injection drive waveform command unit 33 function as a "drive current interruption unit". This valve closing timing is determined as follows. First, a "correction time", which is equivalent to the time difference, is subtracted from or added to the target current supply time until the integrated current value reaches the target integrated current value IStrgt when the standard (reference) electromagnetic fuel injection valve is used. An actual current supply time is thereby calculated. Then, a drive current is fed from a basic time point, or a valve opening timing TimgO of a fixed separated injection pulse PdH(Fix). A time at which the calculated actual current supply time has passed is regarded as a second valve closing timing TimgR. In this way, the second valve closing timing TimgR can be obtained without the use of the current integration comparator.

Figure 12:
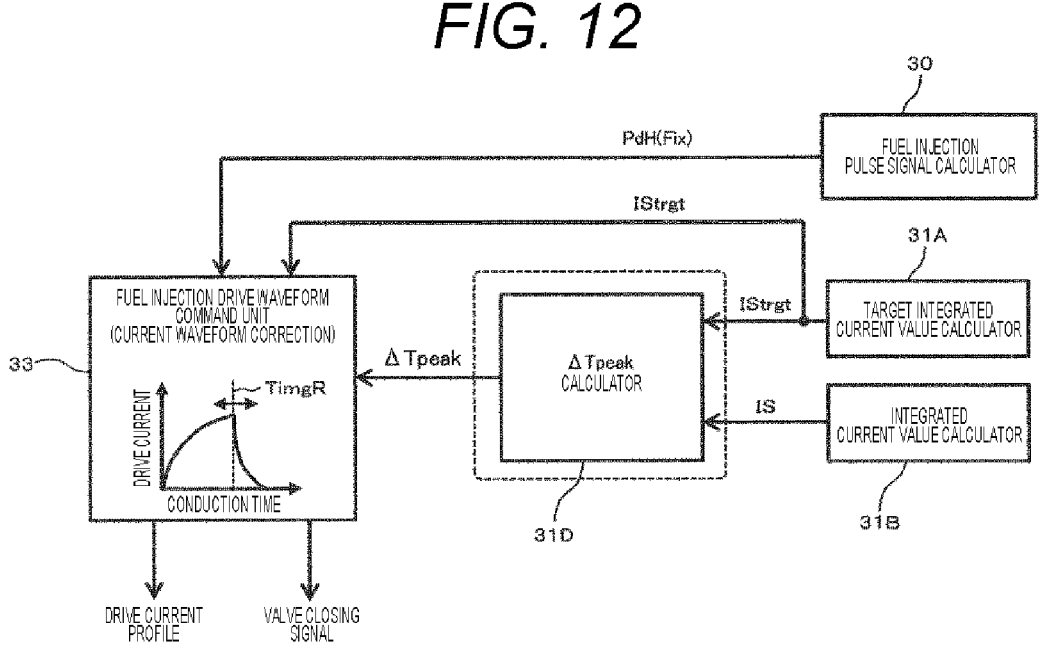
FIG. 12 is an explanatory diagram used to explain functions of a ΔTpeak calculator and a fuel injection drive waveform command unit illustrated in FIG. 11.
Figure 13:
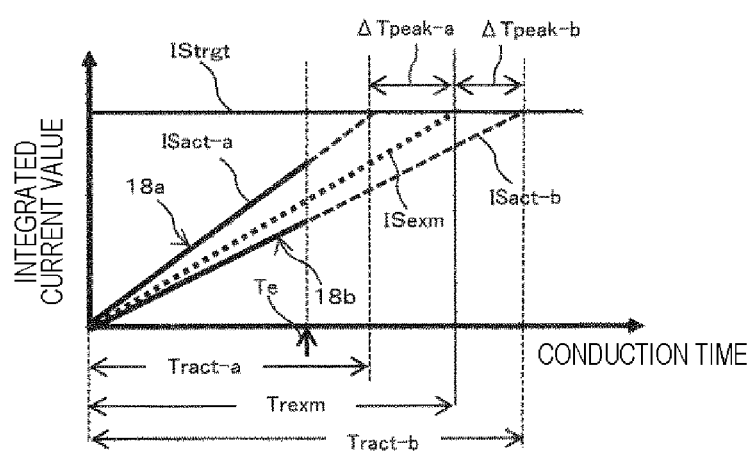
FIG. 13 is an explanatory diagram used to explain a method by which the ΔTpeak calculator illustrated in FIG. 12 determines a ΔTpeak.

FIGS. 12 and 13 each illustrate a method in which the ΔTpeak calculator 31D determines the time difference. In FIG. 12, the ΔTpeak calculator 31D receives the target integrated current value IStrgt from a target integrated current value calculator 31A and also receives an integrated current value IS from the integrated current value calculator 31B; the integrated current value IS refers to a value determined by momently integrating the drive current supplied to an electromagnetic coil 19 in each electromagnetic fuel injection valve 18.

The target integrated current value IStrgt and the integrated current value IS are received in order to determine a target arrival time Trexm and an actual arrival time Tract. The target integrated current value IStrgt refers to a target time until the integrated value reaches the target integrated current value IStrgt when the drive current passes through the electromagnetic coil 19 in the standard (reference) electromagnetic fuel injection valve. The integrated current value IS refers to an actual time until the integrated value for the electromagnetic fuel injection valve 18 reaches the target integrated current value IStrgt.

FIG. 13 illustrates a method in which the ΔTpeak calculator 31D determines a time difference ΔTpeak between two electromagnetic fuel injection valves 18a and 18b. When the drive current flows through the electromagnetic coil 19 in the standard (reference) electromagnetic fuel injection valve, a time at which an integration value ISexm reaches the target integrated current value IStrgt is set to the target arrival time Trexm. Then, at a time when a predetermined calculation timing Te comes, integrated values ISract-a (electromagnetic fuel injection valve 18a) and ISract-b (electromagnetic fuel injection Valve 18b) of the drive currents flowing through the electromagnetic coils 19 in the electromagnetic fuel injection valves 18a and 18b are determined.

When the integrated values ISract-a and ISract-b are determined, slopes of the respective integrated characteristics can be made evident. Therefore, it is possible to estimate actual arrival times Tract-a and Tract-b at which integrated values ISract-a and ISract-b reach the target integrated current value IStrgt.

The actual arrival time Tract-a of the electromagnetic fuel injection valve 18a is earlier than the target arrival time Trexm by the time difference ΔTpeak-a, whereas the actual arrival time Tract-b of the electromagnetic fuel injection valve 18b is later than the target arrival time Trexm by the time difference ΔTpeak-b. Thus, by comparing the target arrival time Trexm and the actual arrival time Tract of each electromagnetic fuel injection valve, the time difference ΔTpeak can be determined. The time difference ΔTpeak represents the machine difference between the electromagnetic fuel injection valves. Since the machine difference differs from electromagnetic fuel injection valve 18 to electromagnetic fuel injection valve 18, the time difference ΔTpeak needs to be calculated and determined for each electromagnetic fuel injection valve 18.

Returning to FIG. 12, the time difference ΔTpeak is supplied to the fuel injection drive waveform command unit 33, and the second valve closing timing TimgR is determined, but in this case, the actual current supply time is determined. Actually, the target integrated current value IStrgt is supplied to the fuel injection drive waveform command unit 33, and the target current supply time corresponding to this target integrated current value IStrgt is set. The target current supply time, which corresponds to the target integrated current value IStrgt, is also determined in advance by an adaptive method (matching) or simulation.

For example, in the electromagnetic fuel injection valve 18a, the actual current supply time is determined from "target current supply time−ΔTpeak-a". In the electromagnetic fuel injection valve 18b, the actual current supply time is determined from "target current supply time+ΔTpeak-b". In this way, the second valve closing timing TimgR for the electromagnetic fuel injection valve 18 can be determined.

As illustrated in FIG. 11, a pulse string is output from a fuel injection pulse signal calculator 30 to a drive circuit 32 as in example 1. However, when a pulse width of a separated injection pulse PdH is narrower than that of the fixed separated injection pulse PdH(Fix), the current integration control is performed. In the following explanation, the fixed separated injection pulse PdH(Fix) for half lift control will be described.

In FIG. 12, when the fixed separated injection pulse PdH(Fix) is output, the fuel injection drive waveform command unit 33 controls the drive current flowing through the electromagnetic coil 19 based on a drive current profile, in synchronization with the fixed separated injection pulse PdH(Fix). In addition, when the fixed separated injection pulse PdH(Fix) is output, the current integration control is performed as in example 1, and the time difference ΔTpeak is obtained by the ΔTpeak calculator 31D as described above. The time difference ΔTpeak is supplied to the fuel injection drive waveform command unit 33, and then the actual current supply time is determined by subtracting or adding the time difference ΔTpeak from/to the target current supply time, as described above.

Next, the drive current is supplied over the determined actual current supply time from the starting point, which is the valve opening timing TimgO of the fixed separated injection pulse PdH(Fix). Then, a time d at which the actual current supply time has passed is regarded as the second valve closing timing TimgR, and the drive current is interrupted. It is obvious that, after the second valve closing timing TimgR, the valve closing signal of the first valve closing timing TimgC of the fixed separated injection pulse PdH(Fix) is supplied to the drive circuit 32, as in example 1.

In the present embodiment, as described above, the drive current interruption unit (fuel injection drive waveform command unit) 33 determines an integrated current value of a drive current supplied to the electromagnetic coil 19 in synchronization with the valve opening signal TimgO. Based on this integrated current value, the drive current interruption unit 33 determines a current supply time in which the drive current is supplied to the electromagnetic coil 19. When a conduction time of the drive current supplied to the electromagnetic coil 19 in synchronization with the valve opening signal TimgO reaches the current supply time, the drive current interruption unit 33 generates the second valve closing timing TimgR and supplies this second valve closing signal to a drive circuit 32.

Furthermore, in the present embodiment, the drive current interruption unit determines the current supply time of the drive current supplied to the electromagnetic coil 19 from the target current supply time Trexm and the correction time ΔTpeak. The target current supply time Trexm is determined from the target integrated current value corresponding to the request fuel injection amount injected from the electromagnetic fuel injection valve 18; and the correction time ΔTpeak is determined from the integrated current value IS of the drive current supplied to the electromagnetic coil 19 in synchronization with the valve opening signal TimgO. When the conduction time of the drive current supplied to the electromagnetic coil 19 in synchronization with the valve opening signal TimgO reaches the current supply time, the drive current interruption unit generates the second valve closing timing TimgR and supplies the second valve closing signal is supplied to the drive circuit 32.

Figure 14:
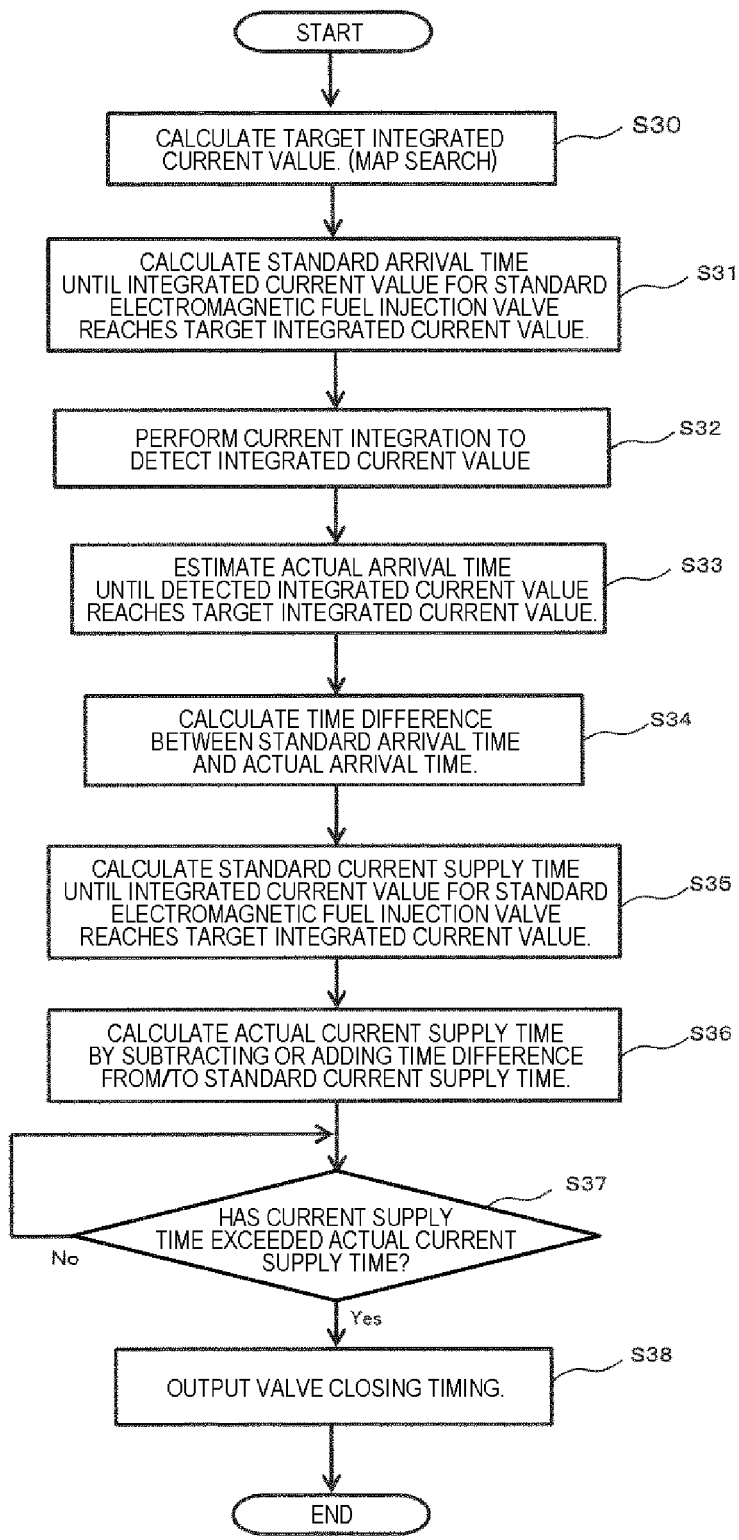
FIG. 14 is a flowchart illustrating a control flow in a case where the current integration control according to the second embodiment of the present invention is performed by a microcomputer.

Next, with reference to FIG. 14, a description will be given of a control flow in a case where the operations illustrated in FIGS. 12 and 13 performed by a microcomputer. Since details have been described above, control steps will be described briefly below.

<<Step S30>> In step S30, the target integrated current value IStrgt corresponding to the request fuel injection amount is found from the map in which the horizontal axis represents the request fuel injection amount and the vertical axis represents the target integrated current value. In this case, the request fuel injection amount refers to a request fuel injection amount corresponding to the separated injection pulse PdH, and this request fuel injection amount is a small amount fuel injection amount to be influenced by the machine difference between the electromagnetic fuel injection valves 18. After the target integrated current value IStrgt is determined through the map search, the process proceeds to step S31.

<<Step S31>> In step S31, the target arrival time Trexm is determined, until the integrated value reaches the target integrated current value IStrgt when the drive current flows through the electromagnetic coil 19 in the standard (reference) electromagnetic fuel injection valve 18. This is determined in advance by a matching method (matching) or simulation. After the target arrival time is determined, the process proceeds to step S32.

<<Step S32>> In step S32, the drive current supplied to the electromagnetic coil 19 in the electromagnetic fuel injection valve 18 is momently integrated, and the integrated value is detected. While the integration operation is continued, the process proceeds to the next step S32.

<<Step S33>> In step S33, at the current calculation timing Te, a slope of an integration value characteristic is calculated from the integration value ISract of the drive current flowing through the electromagnetic coil 19 in the electromagnetic fuel injection valve 18. Then, the actual arrival time Tract is estimated, at which the integration value ISract reaches the target integrated current value IStrgt. After the actual arrival time Tract is completely estimated, the process proceeds to step S34.

<<Step S34>> In step S34, the actual arrival time Tract of the electromagnetic fuel injection valve 18 is shifted from the target arrival time Trexm by the time difference ΔTpeak. By comparing the target arrival time Trexm with the actual arrival time Tract of the electromagnetic fuel injection valve 18, the time difference ΔTpeak is determined. The time difference ΔTpeak represents the machine difference between the electromagnetic fuel injection valves 18, in which case the time difference ΔTpeak is calculated and determined for each electromagnetic fuel injection valve 18.

<<Step S35>> In step S35, the target current supply time corresponding to the target integrated current value IStrgt is calculated. This target current supply time is also determined in advance by a matching method (matching) or simulation. After the target current supply time is determined, the process proceeds to step S36.

<<Step S36>> In step S36, the actual current supply time is calculated by subtracting or adding the time difference ΔTpeak from/to the target current supply time corresponding to the target integrated current value IStrgt calculated in step S35. This actual current supply time is corrected in a direction of suppressing the machine difference between the electromagnetic fuel injection valves, as in example 1. After the actual current supply time is determined, the process proceeds to step S37.

<<Step S37>> In step S37, it is determined whether a time elapsed from the valve opening timing TimgO of the fixed separated injection pulse PdH(Fix) exceeds the actual current supply time. Then, when it is determined that the elapsed time does not exceed the actual current supply time, step S37 is performed again. When it is determined that the elapsed time exceeds the actual current supply time, the process proceeds to step S38.

<<Step S38>> In step S38, since the drive current has been supplied over the actual current supply time, the second valve closing timing TimgR is output, and the process proceeds to an end. In synchronization with the second valve closing timing TimgR, the drive circuit 32 simultaneously turns off the fuel injection valve drivers 16a and 16b. After that, the drive circuit 32 receives the valve closing signal in synchronization with the first valve closing timing TimgC of the fixed separated injection pulse PdH(Fix) as in example 1 (step S17). However, the drive circuit 32 invalidates this valve closing signal based on the first valve closing timing TimgC because it already receives the valve closing signal based on the second valve closing timing TimgR.

This can reliably perform the fuel injection control under the current integration control.

In the above way, the present embodiment can achieve the same control as that of example 1 without using a current integration comparator in hardware.

In the foregoing first and second embodiments, a pulse width of the fixed separated injection pulse is set to that corresponding to the minimum fuel amount that can ensure the linearity. In some cases, however, it may also be set to the pulse width used for the half lift control. In this case, it is determined whether the half lift control is performed from the drive current or the drive voltage of the electromagnetic fuel injection valve, or it is determined that the half lift control is performed by directly detecting a behavior of the valve body. When it is determined or estimated that the half lift control is performed, the pulse width can be set to the widest one for the half lift control.

As described above, provided as an injection pulse forming unit that drives electromagnetic fuel injection valves are a pulse generator 30A and a fixed injection pulse generator 30A. The pulse generator 30A generates an injection pulse for the full lift control. The fixed injection pulse generator 30A generates a fixed injection pulse having a valve opening timing at which a drive signal is supplied to an electromagnetic coil in each electromagnetic fuel injection valve under the half lift control and a first valve closing timing at which the drive signal supplied to the electromagnetic coil in each electromagnetic fuel injection valve is interrupted. A drive current interruption unit 31 is provided to, within a period T(Fix) in which a fixed injection pulse PdH(Fix) is generated by the fixed injection pulse generator 30A to perform the half lift control, determine an electric energy amount IS of the drive current supplied to the electromagnetic coil 19 in response to the valve opening timing TimgO of the fixed injection pulse PdH(Fix). When the determined electric energy amount reaches the preset, predetermined target electric energy amount IStrgt, the drive current interruption unit 31 generates a second valve closing timing TimgR of the fixed injection pulse PdH(Fix) different from a first valve closing timing TimgC and interrupts the drive current to the electromagnetic coil before the first valve closing timing TimgC.

In the foregoing embodiments, an injection pulse is described as a separated injection pulse. However, the injection pulse is not limited to a separated injection pulse. This is because, the fuel injection amount may become a very small fuel injection amount, for example, when the number of idle revolutions decreases. Therefore, in this case, the injection pulse may be defined as the fixed injection pulse, not as the fixed separated injection pulse.

As described above, a configuration of the present invention includes a fixed injection pulse generator that generates a fixed injection pulse having a valve opening timing at which a drive current is supplied to an electromagnetic coil in an electromagnetic fuel injection valve and a first valve closing timing at which the drive current to the electromagnetic coil is interrupted. The configuration further includes a drive current interruption unit that, within a period in which the fixed injection pulse is generated, determines an electric energy amount of a drive current supplied to the electromagnetic coil in response to a valve opening timing of the fixed injection pulse. When the determined electric energy amount reaches a preset, predetermined target electrical energy amount, the drive current interruption unit generates a second valve closing timing of the fixed injection pulse different from a first valve closing timing and interrupts the drive current supplied to the electromagnetic coil before the first valve closing timing.

According to the above, the first valve closing timing of the fixed injection pulse is generated only after the electric energy amount given to the electromagnetic coil reaches the preset, predetermined target electric energy amount and the second valve closing timing is generated. Therefore, the electromagnetic fuel injection valve reliably shifts to the valve closing operation at a time when the electric energy amount reliably reaches the target electric energy amount, thereby suppressing variations in fuel injection amounts to improve exhaust performance and fuel efficiency performance.

It should be noted that the present invention is not limited to the foregoing examples and includes various modifications. For example, the foregoing examples have been described in detail in order to explain the present invention in an easy-to-understand manner and are not necessarily limited to those having all the configurations described. Furthermore, a part of a configuration of one example can be replaced with a configuration of another example. Alternatively, a configuration of one example can be added to a configuration of another example. Moreover, a part of a configuration of each example can undergo addition, deletion, or replacement of another configuration.

REFERENCE SIGNS LIST 10 fuel injection control apparatus
11 operation state detector
15 high-voltage generator
16a, 16b fuel injection valve driver
17 microcomputer
18 electromagnetic fuel injection valve
19 fuse
20 power relay
21 battery power source
30 fuel injection pulse signal calculator
30A separated injection pulse calculator
30B fixed separated injection pulse calculator
30C pulse width/current integration determiner
31 current integration controller
31A target integrated current value calculator
31B integrated current value calculator
31C integrated current value comparator
32 drive circuit

The invention claimed is:

1. A fuel injection control apparatus configured to control an electromagnetic fuel injection valve via which fuel is to be supplied to an internal combustion engine, the fuel injection control apparatus comprising:
　　a fixed injection pulse generator configured to generate a fixed injection pulse as an injection pulse for use in driving the electromagnetic fuel injection valve, the fixed injection pulse having a valve opening timing at which a drive current is supplied to an electromagnetic coil in the electromagnetic fuel injection valve and a first valve closing timing at which the drive current supplied to the electromagnetic coil is interrupted; and
　　a drive current interrupter configured to, within a period in which the fixed injection pulse is generated, determine an electric energy amount of the drive current supplied to the electromagnetic coil in response to the valve opening timing of the fixed injection pulse and, when the determined electric energy amount reaches a preset, predetermined target electric energy amount, generate a second valve closing timing of the fixed injection pulse different from the first valve closing timing and then interrupt the drive current supplied to the electromagnetic coil before the first valve closing timing,
　　wherein
　　the fixed injection pulse generator is configured to supply a drive circuit with a valve opening signal based on the valve opening timing and a first valve closing signal based on the first valve closing timing,
　　the drive circuit is configure to supply, in response to the valve opening signal, the drive current to the electromagnetic coil, the drive current interrupter, in response to the valve opening signal, is configured to determine the electric energy amount of the drive current supplied to the electromagnetic coil, and the drive current interrupter is configured to, when the determined electric energy amount reaches the preset, predetermined target electric energy amount, supply the drive circuit with a second valve closing signal based on the second valve closing timing earlier than the first valve closing signal, to interrupt the drive current to the electromagnetic coil, wherein the drive current interrupter is configured to determine the integrated current value of the drive current supplied to the electromagnetic coil in synchronization with the valve opening signal, the drive current interrupter is configured to, based on the determined integrated current value, determine a current supply time in which the drive current is supplied to the electromagnetic coil, and the drive current interrupter is configured to, when a conduction time of the drive current supplied to the electromagnetic coil in synchronization with the valve opening signal reaches the current supply time, generate the second valve closing timing and supply the second valve closing signal to the drive circuit.

2. The fuel injection control apparatus according to claim 1, wherein the drive current interrupter is configured to determine an integrated current value of the drive current supplied to the electromagnetic coil in synchronization with the valve opening signal, and the drive current interrupter is configured to, when the determined integrated current value reaches a preset, predetermined target integrated current value, supply the drive circuit with the second valve closing signal based on the second valve closing timing.

3. The fuel injection control apparatus according to claim 2, wherein the drive current interrupter includes:

an integrated current value calculator configured to determine the integrated current value of the drive current supplied to the electromagnetic coil in synchronization with the valve opening signal;

a target integrated current value calculator configured to determine a target integrated current value corresponding to a request fuel injection amount injected from the electromagnetic fuel injection valve; and an integrated current value comparator configured to generate the second valve closing timing at a time when the integrated current value reaches the target integrated current value and supplies the second valve closing signal to the drive circuit.

4. The fuel injection control apparatus according to claim 1, wherein the drive circuit is configured to validate a valve closing timing, the valve closing timing being one of the first valve closing signal based on the first valve closing timing and the second valve closing signal based on the second valve closing timing which is supplied earlier to the driving circuit.

5. The fuel injection control apparatus according to claim 1, wherein the drive current interrupter is configured to determine the current supply time of the drive current supplied to the electromagnetic coil from a target current supply time and a correction time, the target current supply time being determined from the target integrated current value corresponding to the request fuel injection amount injected from the electromagnetic fuel injection valve, the correction time being determined from the integrated current value of the drive current supplied to the electromagnetic coil, and drive current interrupter is configured to, when the conduction time of the drive current supplied to the electromagnetic coil in synchronization with the valve opening signal reaches the current supply time, generate the second valve closing timing and supply the second valve closing signal to the drive circuit.

6. The fuel injection control apparatus according to claim 3, wherein the target integrated current value is determined from a map that stores the target integrated current value corresponding to the request fuel injection amount that has been determined in advance in a standard electromagnetic fuel injection valve.

7. A fuel injection control apparatus configured to control an electromagnetic fuel injection valve via which fuel is to be supplied to an internal combustion engine, the fuel injection control apparatus comprising:

a fixed injection pulse generator configured to generate a fixed injection pulse as an injection pulse for use in driving the electromagnetic fuel injection valve, the fixed injection pulse having a valve opening timing at which a drive current is supplied to an electromagnetic coil in the electromagnetic fuel injection valve and a first valve closing timing at which the drive current supplied to the electromagnetic coil is interrupted; and a drive current interrupter configured to, within a period in which the fixed injection pulse is generated, determine an electric energy amount of the drive current supplied to the electromagnetic coil in response to the valve opening timing of the fixed injection pulse and, when the determined electric energy amount reaches a preset, predetermined target electric energy amount, generate a second valve closing timing of the fixed injection pulse different from the first valve closing timing and then interrupt the drive current supplied to the electromagnetic coil before the first valve closing timing, wherein the fixed injection pulse generator is configured to supply a drive circuit with a valve opening signal based on the valve opening timing and a first valve closing signal based on the first valve closing timing, the drive circuit is configure to supply, in response to the valve opening signal, the drive current to the electromagnetic coil, the drive current interrupter, in response to the valve opening signal, is configured to determine the electric energy amount of the drive current supplied to the electromagnetic coil, and the drive current interrupter is configured to, when the determined electric energy amount reaches the preset, predetermined target electric energy amount, supply the drive circuit with a second valve closing signal based on the second valve closing timing earlier than the first valve closing signal, to interrupt the drive current to the electromagnetic coil, wherein the fuel injection control apparatus further comprising:

a separated injection pulse calculator configured to form a plurality of separated injection pulses by dividing a target fuel injection amount required for one combustion cycle by a predetermined separation number;

a pulse comparator configured to compare a pulse width of the separated injection pulse with each of pulse widths of one or more preset, predetermined comparison pulses; and a pulse converter configured to, when the pulse comparator determines that the separated injection pulse is narrower, replace the separated injection pulse determined to be narrower with the fixed injection pulse from the fixed injection pulse generator.

8. The fuel injection control apparatus according to claim 7, wherein each of the pulse widths of the comparison pulses compared by the pulse comparator is set to a time width corresponding to a "minimum fuel injection amount" that ensures linearity of a flow rate characteristic of a fuel injection amount and an injection pulse width.

9. The fuel injection control apparatus according to claim 8, wherein the pulse widths of the comparison pulse are set to be the same as a pulse width of the fixed injection pulse.

10. The fuel injection control apparatus according to claim 8, wherein
the drive circuit is configured to supply the drive current to the electromagnetic coil, and
the pulse width of the fixed injection pulse is set to be wider than a time until the drive current reaches zero after the drive current has been interrupted in response to the second valve closing signal.

11. The fuel injection control apparatus according to claim 7, wherein
the pulse converter is configured to generate a pulse string containing separated pulses for full lift control of the electromagnetic fuel injection valve and subsequent separated pulses for half lift control, and
when a last one of the separated pulses for the half lift control in the pulse string is narrower than the fixed injection pulse, the pulse converter is configured to replace the last separated pulse for the half lift control with the fixed injection pulse.

12. The fuel injection control apparatus according to claim 7, wherein
the separated injection pulse calculator is configured to consider that the separated injection pulse when the number of separated injections is equal to or greater than a predetermined number or the separated injection pulse when the valve opening timing or an injection completion timing of the electromagnetic fuel injection valve is later than a predetermined timing is used for the half lift control, and
the pulse comparator and the pulse converter are configured to, when it is determined that the divided pulse is narrower than the fixed injection pulse, replace the separated pulse with the fixed injection pulse.

13. The fuel injection control apparatus according to claim 11, wherein the separated injection pulse calculator is configured to calculate the pulse string before the separated injection pulse is injected for a first time.

14. A fuel injection control apparatus configured to control an electromagnetic fuel injection valve via which fuel is to be supplied to an internal combustion engine, the fuel injection control apparatus comprising:

a separated injection pulse calculator configured to form a plurality of separated injection pulses by dividing a target fuel injection amount required for one combustion cycle by a predetermined separated number;

a pulse converter configured to compare each of pulse widths of the separated injection pulses with a pulse width of a preset, predetermined fixed separated injection pulse and, when one of the separated injection pulses is narrower, replace the narrower separated injection pulse with the fixed separated injection pulse;

a drive current interrupter configured to, within a period in which the fixed separated injection pulse is generated, determine an integrated current value of a drive current supplied to the electromagnetic coil in synchronization with a valve opening timing of the fixed separated injection pulse and, when the integrated current value reaches a preset, predetermined target integrated current value, generate a valve closing timing earlier than a valve closing timing of the fixed separated injection pulse; and a drive circuit configured to supply the drive current to the electromagnetic coil in synchronization with the valve opening timing of the fixed separated injection pulse and interrupt the drive current supplied to the electromagnetic coil in synchronization with a valve closing timing, the valve closing timing being an earlier one of a valve closing timing based on the fixed separated injection pulse and a valve closing timing based on the drive current interrupter.

\* \* \* \* \*